(12) United States Patent
Nakajima

(10) Patent No.: US 8,693,786 B2
(45) Date of Patent: Apr. 8, 2014

(54) MARKER DETERMINATION DEVICE, MARKER DETERMINATION DETECTION SYSTEM, MARKER DETERMINATION DETECTION DEVICE, MARKER, MARKER DETERMINATION METHOD, AND PROGRAM THEREFOR

(75) Inventor: Noboru Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 42 days.

(21) Appl. No.: 13/386,306

(22) PCT Filed: Jul. 22, 2010

(86) PCT No.: PCT/JP2010/062384
§ 371 (c)(1),
(2), (4) Date: Jan. 20, 2012

(87) PCT Pub. No.: WO2011/010707
PCT Pub. Date: Jan. 27, 2011

(65) Prior Publication Data
US 2012/0114254 A1   May 10, 2012

(30) Foreign Application Priority Data
Jul. 23, 2009   (JP) ................................. 2009-171842

(51) Int. Cl.
*G06K 9/00*   (2006.01)
(52) U.S. Cl.
USPC ........................................................ 382/201
(58) Field of Classification Search
None
See application file for complete search history.

(56) References Cited

U.S. PATENT DOCUMENTS

| 5,412,487 A | 5/1995 | Nishimura et al. |
| 2005/0234333 A1 | 10/2005 | Takemoto et al. |
| 2010/0104135 A1* | 4/2010 | Nakajima ..................... 382/103 |

FOREIGN PATENT DOCUMENTS

JP   2003223639 A   8/2003

OTHER PUBLICATIONS

On the Removal of Shadows from Images. Finlayson et al. 2006.*
On the Optimal Detection of Curves in Noisy Pictures. Montanari et al. 1971.*
Separating Reflection Components of Textured Surfaces Using a Single Image. Tan et al. 2005.*
Multiple View Geometry. Hartley et al. 1999.*
Finlayson et al, "On the Removal of Shadows from Images", IEEE Transactions on Pattern Analysis and Machine Intelligence, vol. 28, No. 1, Jan. 2006, pp. 59-68.
Hartley et al, "Multiple View Geometry", CVPR, Jun. 1999, 57 pgs.
Montanari et al, "On the Optimal Detection of Curves in Noisy Pictures", Communication of the ACM, vol. 14, No. 5, May 1971, pp. 335-345.

(Continued)

*Primary Examiner* — Stephen R Koziol
*Assistant Examiner* — Delomia Gilliard
(74) *Attorney, Agent, or Firm* — Sughrue Mion, PLLC

(57) ABSTRACT

Provided is a marker judgment device which has a feature storage means and a feature comparison means. The feature storage means disposes feature points extracted from an image in a predetermined space, sets parts in which the number of feature points in the predetermined space is equal to or less than a predetermined number as singular features, and stores the singular features and feature points extracted from an existing mark. The feature comparison means disposes the feature points extracted from the existing mark in the predetermined space, and judges that the existing mark is capable of being used as a marker which is detectable from the image, when the number of feature points that coincide with the singular features is equal to or more than a predetermined number.

16 Claims, 34 Drawing Sheets

(56) References Cited

OTHER PUBLICATIONS

Pun et al, "Log-Polar Wavelet Energy Signatures for Rotation and Scale Invariant Texture Classification", IEEE Transactions on Pattern Analysis and Machine Intelligence, vol. 25, No. 5, May 2003, pp. 590-602.

Tan et al, "Separating Reflection Components of Textured Surfaces Using a Single Image", IEEE Transactions on Pattern Analysis and Machine Intelligence, vol. 27, No. 2, Feb. 2005, pp. 178-193.

Tommasini et al; "Making Good Features track Better", Computer Vision and Pattern Recognition, Jun. 23-25, 1998, 6 pgs.

Office Action received Oct. 31, 2013, issued by the State Intellectual Property Office of the P.R.C. in corresponding Chinese Application No. 2010800327456.

\* cited by examiner

FIG. 3

<UNIQUE FEATURE INFORMATION TABLE>

| A | B | C | D |
|---|---|---|---|
|   | t1 | $x_{1001}$ | $y_{1001}$ |
|   | t2 | $x_{1002}$ | $y_{1002}$ |
| F1 | t3 | $x_{1003}$ | $y_{1003}$ |
|   | t4 | $x_{1004}$ | $y_{1004}$ |
|   | t5 | $x_{1005}$ | $y_{1005}$ |

A: SERIAL NUMBER OF UNIQUE FEATURE INFORMATION TABLE
B: SERIAL NUMBER OF UNIQUE FEATURE
C: X COORDINATE OF UNIQUE FEATURE
D: Y COORDINATE OF UNIQUE FEATURE

FIG. 4

<MARK FEATURE INFORMATION TABLE>

| A | B | C | D |
|---|---|---|---|
| M1 | t1 | $x_{101}$ | $y_{101}$ |
|  | t2 | $x_{102}$ | $y_{102}$ |
|  | t3 | $x_{103}$ | $y_{103}$ |
|  | t4 | $x_{104}$ | $y_{104}$ |
|  | t5 | $x_{105}$ | $y_{105}$ |

A: SERIAL NUMBER OF MARK
B: SERIAL NUMBER OF FEATURE POINT
C: X COORDINATE OF FEATURE POINT
D: Y COORDINATE OF FEATURE POINT (SEGMENT IN WHICH FEATURE POINTS OF MARK MATCHING
WITH INVARIANT FEATURES ARE INCLUDED)

(BACKGROUND VIDEO IMAGE)

(FEATURE SPACE)

FIG. 14

<FEATURE POINT INFORMATION TABLE>

| A | B | C | D |
|---|---|---|---|
| f1 | t1 | $x_{1001}$ | $y_{1001}$ |
|  | t2 | $x_{1002}$ | $y_{1002}$ |
|  | t3 | $x_{1003}$ | $y_{1003}$ |
|  | t4 | $x_{1004}$ | $y_{1004}$ |
|  | t5 | $x_{1005}$ | $y_{1005}$ |

A: SERIAL NUMBER OF FRAME IMAGE
B: SERIAL NUMBER OF FEATURE POINT
C: X COORDINATE OF FEATURE POINT
D: Y COORDINATE OF FEATURE POINT (FEATURE SPACE)

FIG. 16

<DESIGNATIONS OF RESPECTIVE SEGMENT> → X

|  | x1 | x2 | x3 | x4 |
|---|---|---|---|---|
| y1 | SEGMENT(1,1) | SEGMENT(2,1) | SEGMENT(3,1) | SEGMENT(4,1) |
| y2 | SEGMENT(1,2) | SEGMENT(2,2) | SEGMENT(3,2) | SEGMENT(4,2) |
| y3 | SEGMENT(1,3) | SEGMENT(2,3) | SEGMENT(3,3) | SEGMENT(4,3) |
| y4 | SEGMENT(1,4) | SEGMENT(2,4) | SEGMENT(3,4) | SEGMENT(4,4) |

<SEGMENT COORDINATE TABLE> → X

|  | x1 | x2 | x3 | x4 |
|---|---|---|---|---|
| y1 | SEGMENT (1,1) COORDINATE (x1,y1) | SEGMENT (2,1) COORDINATE (x2,y1) | SEGMENT (3,1) COORDINATE (x3,y1) | SEGMENT (4,1) COORDINATE (x4,y1) |
| y2 | SEGMENT (1,2) COORDINATE (x1,y2) | SEGMENT (2,2) COORDINATE (x2,y2) | SEGMENT (3,2) COORDINATE (x3,y2) | SEGMENT (4,2) COORDINATE (x4,y2) |
| y3 | SEGMENT (1,3) COORDINATE (x1,y3) | SEGMENT (2,3) COORDINATE (x2,y3) | SEGMENT (3,3) COORDINATE (x3,y3) | SEGMENT (4,3) COORDINATE (x4,y3) |
| y4 | SEGMENT (1,4) COORDINATE (x1,y4) | SEGMENT (2,4) COORDINATE (x2,y4) | SEGMENT (3,4) COORDINATE (x3,y4) | SEGMENT (4,4) COORDINATE (x4,y4) |

<FEATURE POINT NUMBER DISTRIBUTION DIAGRAM>

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 0 | 0 | 1 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 1 | 0 | 1 | 1 | 2 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 1 | 2 | 0 | 1 | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 6 | 0 | 0 | 0 | 0 | 0 | 0 | 0 | 0 | 0 | 1 | 0 | 0 | 2 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 1 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 1 | 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

(MARK IMAGED BY VIDEO IMAGE INPUTTING MEANS)

(FEATURE POINTS EXTRACTED FROM MARK)

(FEATURE SPACE HAVING FEATURE POINTS ARRANGED THEREIN)

(INVARIANT FEATURE SPACE)

(INVARIANT FEATURE SPACE)

(INVARIANT FEATURE SPACE)

(INVARIANT FEATURE SPACE)

(INVARIANT FEATURE SPACE)

(MARKER PATTERN GENERATION SCOPE)

(MARKER PATTERN GENERATION SCOPE)

(DETECTION-TARGETED VIDEO IMAGE)

(FEATURE SPACE)

FEATURE POINT GROUP
EXTRACTED FROM MARK PART

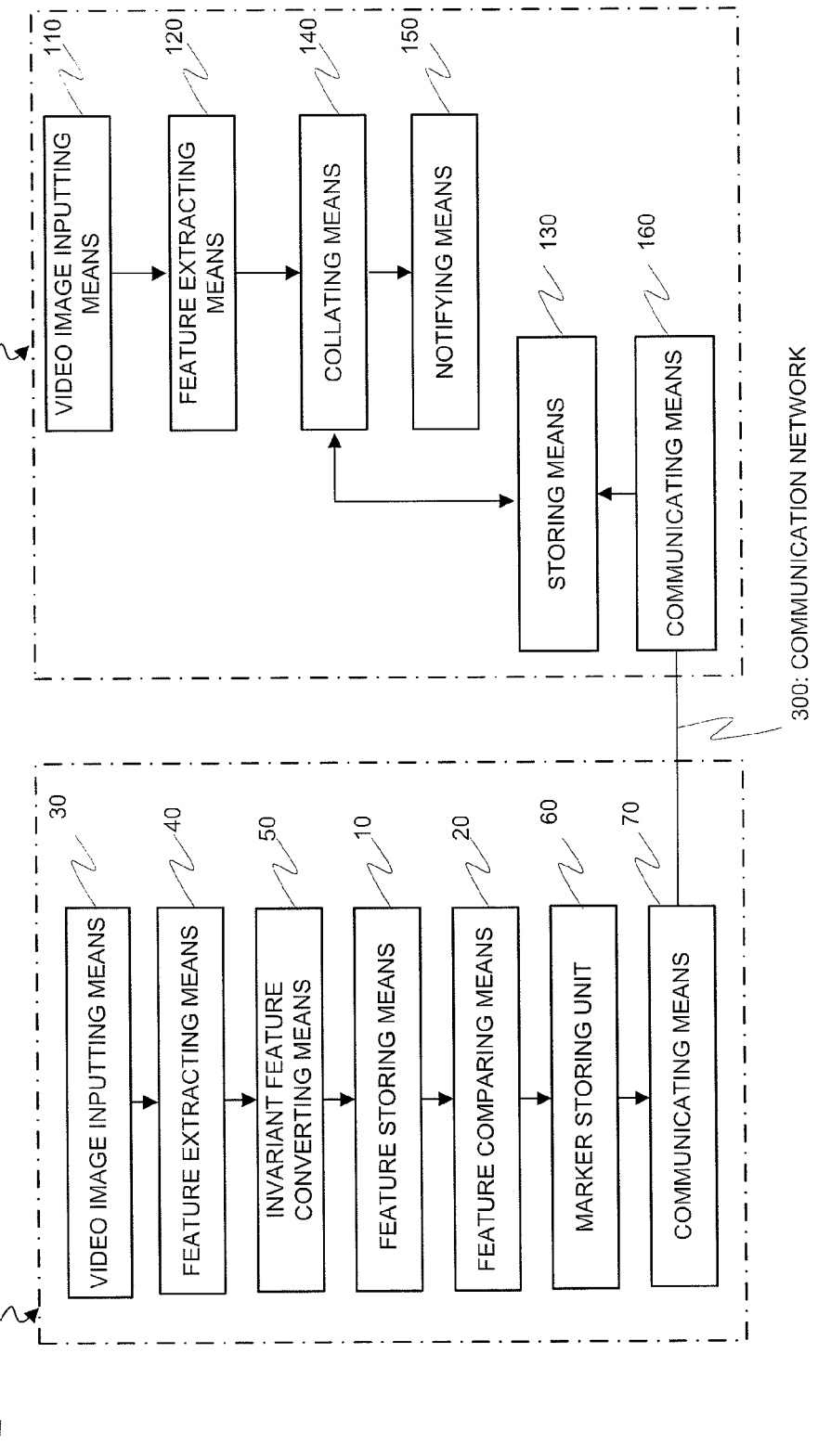

MARKER DETERMINATION DEVICE, MARKER DETERMINATION DETECTION SYSTEM, MARKER DETERMINATION DETECTION DEVICE, MARKER, MARKER DETERMINATION METHOD, AND PROGRAM THEREFOR

CROSS REFERENCE TO RELATED APPLICATIONS

This application is a National Stage of International Application No. PCT/JP2010/062384 filed Jul. 22, 2010, claiming priority based on Japanese Patent Application No. 2009-171842, filed Jul. 23, 2009, the contents of all of which are incorporated herein by reference in their entirety.

TECHNICAL FIELD

The present invention relates to a marker determination device for determining whether or not an existing mark can be used as a detection marker, a marker determination detection system provided with this marker determination device, a marker determination detection device provided with a marker determination function, a marker determined to be usable as the detection marker by the marker determination function, a marker determination method of making a determination of its detection marker, and a marker determination program for executing this marker determination.

BACKGROUND ART

As a method of identifying whether or not a desired object exists in a certain space, the following method exists.

For example, the technology of imaging the image of the space in which no marker exists as a background video image with an video image inputting means in a marker generation stage, extracting feature points from the above background video image, mapping these feature points onto an invariant feature space, thereby to define them as invariant features, defining portions in which these invariant features do not appear as unique features, generating a marker pattern based upon these unique features, and in a marker detection stage, imaging the image of the space containing the object added with the marker as a detection-targeted video image, extracting the feature points from this detection-targeted video image, determining whether or not a segment matching with an arrangement of the feature points extracted from the marker pattern exists in an arrangement of these feature points, and detecting this as the marker when the matching one exists (for example, see Patent Literature 1).

With this technology, the pattern not appearing in the background video image can be generated as the marker pattern in the marker generation stage. This prevents the marker from being erroneously detected from a location in which no marker exists, out of the detection-targeted video images, thereby enabling the marker added to the objet to be surely detected in the marker detection stage.

CITATION LIST

Patent Literature
PTL 1: International Publication No. WO2008/090908 (pamphlet)

SUMMARY OF INVENTION

Technical Problem

However, in the technology described in the above-mentioned Patent literature 1, the following situation surfaces.

The same technology generates the marker based upon the unique features.

And, the same technology detects the object added with the above marker in the marker detection stage.

As it is, various marks are used in our life environment. The designs ranging from a simple design to a complicated design are variegated.

Selecting some marks arbitrarily from among these already-existing marks, and using these as markers for detecting the object enables the design to be selected freely, and the mark with a favorite design to be used as the marker.

Further, when the mark that is used usually can be used as the detection marker, it is efficient, and yet, functionality of the above mark can be enhanced.

As one example thereof, a logo mark of a company may be listed. By adding a logo mark to a certain product, the logo mark indicates that the above product is a product of the company suggested by the logo mark. The reason is that the logo marks has a function (distinctiveness) of causing consumers to recognize that the above product is a product of its company, and is not a product of other companies.

So as to have this distinctiveness, the logo mark is usually prepared by employing a design different from the design of the logo mark of other companies.

The function that this logo mark has, namely, the function indicating that the object added with the above logo mark differs from the other objects because the above logo mark differs from the other marks in the design is also in common with the function of the detection marker.

That is, it is also thinkable to perform the object detection by making the best use of the distinctiveness that the logo mark originally includes.

Thereupon, it is required to make a proposal of a method of determining whether or not the logo mark could function as the detection marker.

In addition, recently, at the moment of laying out industrial goods, prior to selecting parts and improving the functions, an appearance shape and a design of the above goods are firstly laid out, and thereafter, the selection of the parts, the improvement of the functions and the like are implemented so as to conform to these forms etc.

To the contrary, the technology presented in the before-described Patent literature 1 decides the design of the marker in such a manner that the unique features are selected in a predetermined space, and the feature points are extracted by use of these unique features. That is, the design of the marker is produced based upon the unique features.

As it is, the marker attracts attention because it is added to the object. In particular, with the case in which the object is a product, it is also thinkable to add the marker to one part of a label. By doing so, the design of the above marker becomes important.

Thereupon, also for the marker, it is required to make a proposal of a technology capable of deciding the design based upon the unique feature while putting an importance on the design.

The present invention has been accomplished in consideration of the above-mentioned situations, and an object thereof is to provide a marker determination device, a marker determination detection system, a marker determination detection device, a marker, a marker determination method, and a marker determination program that make it possible to determine whether the existing mark such as the logo mark, the mark of which the design has been decided beforehand, and the like can be used as a marker for detecting the object.

Solution to Problem

The present invention is a marker determination device in which feature points extracted from an image are arranged in a predetermined space, and portions of this predetermine space in which the number of said feature points is equal to or less than a predetermined number are defined as unique features, comprising: a feature storing means that stores these unique features, and the feature points extracted from an existing mark; and a feature comparing means that arranges the feature points extracted from said existing mark in said predetermined space, and determines that said existing mark can be used as a marker that is detectable from said image when the number of the feature points matching with said unique features is equal to or more than a predetermined number.

The present invention is a marker determination detection system comprising a marker determination device and a marker detection device: wherein said marker determination device comprises: a first video image inputting means that inputs an image; a first arranging means that extracts feature points from said image inputted by this first video image inputting means and displays these extracted feature points onto a predetermined space; a unique feature selecting means that selects as unique features portions of said space in which the number of said feature points is equal to or less than a predetermined number; a feature comparing means that arranges the feature points based upon an existing mark in said predetermined space, selects the feature points matching with said unique features, and determines that said mark can be used as a marker that is detectable from said image when the number of these selected feature points is equal to or more than a predetermined number; a marker storing means that stores the feature points of said mark; and wherein said marker detection device comprises: a second video image inputting means that inputs the image; a second arranging means that extracts the feature points based upon said image inputted by this second video image inputting means, and displays these extracted feature points onto the predetermined space; and a collating means that determines whether or not an arrangement of the feature point based upon said marker exists in an arrangement of a feature point group displayed onto said predetermined space.

The present invention is a marker determination detection device, comprising: a first video image inputting means that inputs an image; a first arranging means that extracts feature points from said image inputted by this first video image inputting means, and displays these extracted feature points onto a predetermined space; a unique feature selecting means that selects as unique features portions of said space in which the number of said feature points is equal to or less than a predetermined number; a feature comparing means that arranges the feature points based upon an existing mark in said predetermined space, selects the feature points matching with said unique features, and determines that said existing mark can be used as a marker that is detectable from said image when the number of these selected feature points is equal to or more than a predetermined number; a marker storing means that stores said marker; a second video image inputting means that inputs the image; a second arranging means that extracts the feature points based upon said image inputted by this second video image inputting means, and displays these extracted feature points onto the predetermined space; and a collating means that determines whether or not an arrangement of the feature point corresponding to said marker exists within an arrangement of a feature point group displayed onto said predetermined space.

The present invention is a marker, wherein said marker is determined to be usable as a marker that is detectable from an image when feature points are extracted from said image, these extracted feature points are displayed in a predetermined space, portions of said predetermine space in which the number of said feature points is equal to or less than a predetermined number are selected as unique features, the feature points are extracted from an existing mark, these feature points are arranged in said predetermined space, the feature points matching with said unique features are selected, and the number of these selected feature points is equal to or more than a predetermined number.

The present invention is a marker determination method comprising the steps of: inputting an image; extracting feature points from said image, and displaying these extracted feature points onto a predetermined space; selecting as unique features portions of said space in which the number of said feature points is equal to or less than a predetermined number; and arranging the feature points based upon an existing mark in said predetermined space, selecting the feature points matching with said unique features, and determining that said existing mark can be used as a marker that is detectable from said image when the number of these selected feature points is equal to or more than a predetermined number.

The present invention is a marker determination program for causing an information processing device to execute the processes of: inputting an image; extracting feature points from said image, and displaying these extracted feature points onto a predetermined space; selecting as unique features portions of said space in which the number of said feature points is equal to or less than a predetermined number; and arranging the feature points based upon an existing mark in said predetermined space, selecting the feature points matching with said unique features, and determining that said existing mark can be used as a marker that is detectable from said image when the number of these selected feature points is equal to or more than a predetermined number.

Advantageous Effect of Invention

The marker determination device, the marker determination detection system, the marker determination detection device, the marker, the marker determination method, and the marker determination program of the present invention are configured to extract the feature points from the mark, being a determination target, to arrange these feature points in a predetermined space, and to determine whether these feature points match with the unique features, whereby it can be determined whether or not the existing mark and the mark of which the design has been decided beforehand could become a detection target of the marker detection device.

BRIEF DESCRIPTION OF DRAWINGS

FIG. 3 is a chart illustrating a configuration of a unique feature information table.

FIG. 4 is a chart illustrating a configuration of a mark feature information table.

FIG. 14 is a chart illustrating a configuration of the feature point information table.

FIG. 16 is a view illustrating designations of the segments.

FIG. 17 is a view illustrating the coordinates of the segments.

FIG. 18 is a chart illustrating a configuration of a feature point number distribution diagram (frequency distribution).

FIG. 45 is a block diagram illustrating a configuration of the marker determination detection system.

DESCRIPTION OF EMBODIMENTS

Hereinafter, the preferred exemplary embodiments of the marker determination device, the marker determination detection system, the marker determination detection device, the marker, the marker determination method, and the marker determination program relating to the present invention will be explained by making a reference to the accompanied drawings.

[The First Exemplary Embodiment of the Marker Determination Device and the Marker Determination Method]

At first, the first exemplary embodiment of the marker determination device and the marker determination method of the present invention will be explained by making a reference to FIG. 1.

The same figure is a block diagram illustrating a configuration of the marker determination device of this exemplary embodiment.

(I) Marker Determination Device

Figure 1:
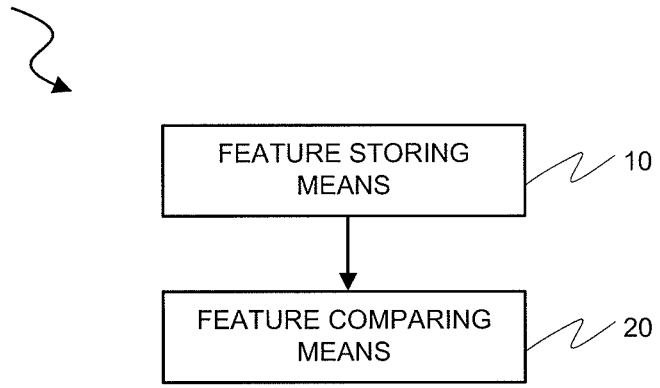
FIG. 1 is a block diagram illustrating a configuration of the marker determination device in a first exemplary embodiment of the present invention.

As shown in FIG. 1, a marker determination device 1a is provided with a feature storing means 10 and a feature comparing means 20.

Figure 2:
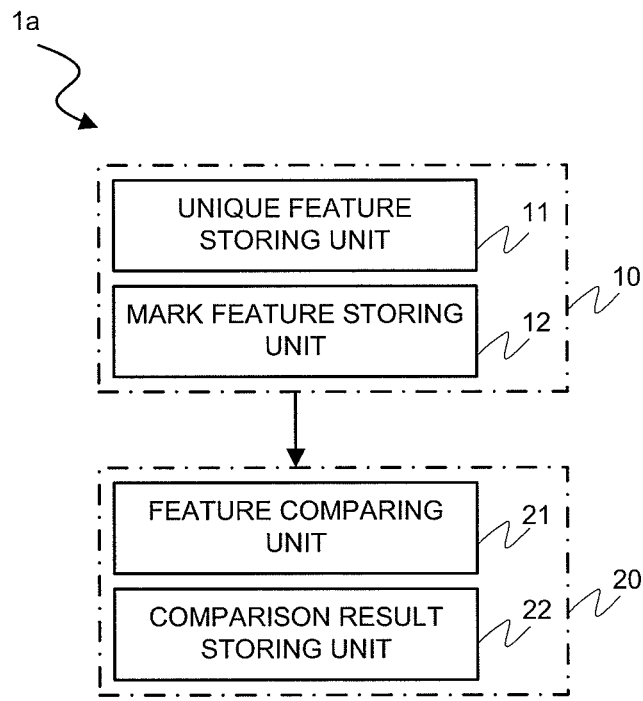
FIG. 2 is a block diagram illustrating a detailed configuration of the marker determination device in the first exemplary embodiment of the present invention.

The feature storing means 10 includes a unique feature storing unit 11 and a mark feature storing unit 12 as shown in FIG. 2.

The unique feature storing unit 11 holds a predetermined memory region. This unique feature storing unit 11 stores "the unique feature information table".

"The unique feature information table" is a table in which data related to the unique features arranged in a predetermined space has been put together.

This "unique feature information table", as shown in FIG. 3, may include "a serial number of the table" (A), "a serial number of the unique feature" (B), "an x coordinate of the unique feature" (C), and "a y coordinate of the unique feature" (D) as an item, respectively.

When one unique feature information table, or two or more exists, "the serial number of the table" is indicative of the number (No.) added to each unique feature information table.

When the video image to be inputted by a video image inputting means 30 (to be later described) is configured of a plurality of frame images, the above number is equivalent to a number added for each frame image.

"The serial number of the unique feature" is indicative of a number added to each of a plurality of the unique features.

"The x coordinate of the unique feature" is indicative of an x coordinate of the above unique feature in the predetermined space.

"The y coordinate of the unique feature" is indicative of a y coordinate of the above unique feature in the predetermined space.

Additionally, the predetermined space includes, for example, the feature space, the invariant feature space, the unique feature space and the like.

Further, the feature space, the invariant feature space, and the unique feature space will be explained in details in the second exemplary embodiment. In addition, the method of extracting the unique features or the like will be also explained in details in the second exemplary embodiment.

The mark feature storing unit 12 holds a predetermined memory region. This mark feature storing unit 12 stores "the mark feature information table".

"The mark feature information table", as shown in FIG. 4, may include "a serial number of the mark" (A), "a serial number of the feature point" (B), "an x coordinate of the feature point" (C), and a y coordinate of the feature point" (D) as an item, respectively.

"The serial number of the mark" is indicative of a number added to one mark, or each of two or more marks.

"The serial number of the feature point" is indicative of a number added to one feature point, or each of two or more feature points based upon the mark.

"The x coordinate of the feature point" is indicative of an x coordinate of the above feature point in the predetermined space.

"The y coordinate of the feature point" is indicative a y coordinate of the above feature point in the predetermined space.

Additionally, "the predetermined space" includes, for example, the feature space, the invariant feature space and the like.

Further, "the feature point" includes the feature point extracted from the mark, the feature point arranged in the feature space, the invariant feature arranged in the invariant feature space, and the like.

These feature space and invariant feature space will be explained in details in the second exemplary embodiment. In addition, the method of extracting the invariant features, or the like will be also explained in details in the second exemplary embodiment.

The feature comparing means 20 includes a feature comparing unit 21 and a comparison result storing unit 22 as shown in FIG. 2.

The feature comparing unit 21 takes out "the unique feature information table" from the unique feature storing unit 11 of the feature storing means 10. Further, the feature comparing unit 21 takes out "the mark feature information table" from the mark feature storing unit 12 of the feature storing means 10.

Figure 5:
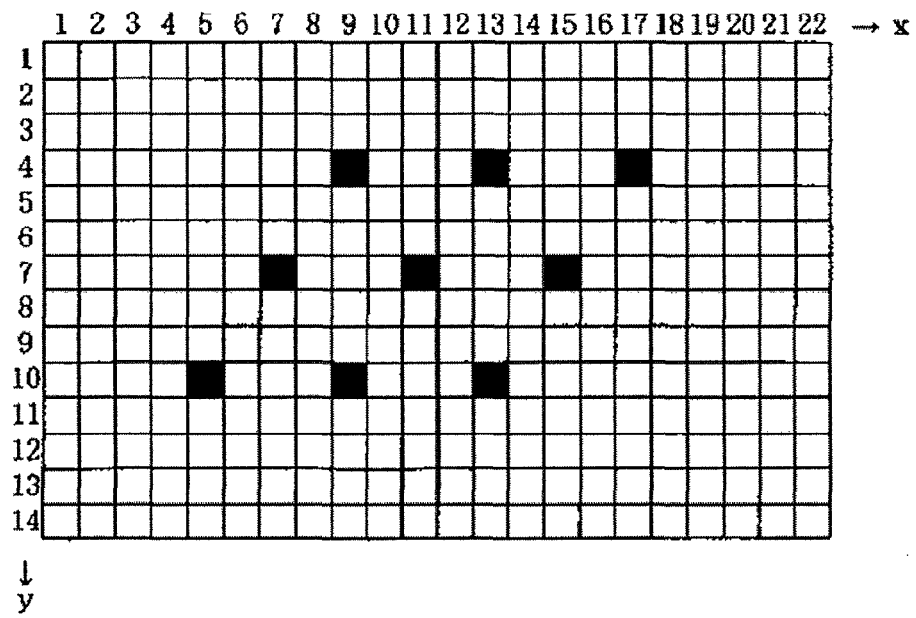
FIG. 5 is a view illustrating an invariant feature space having the invariant features of the mark arranged therein.

Next, the feature comparing unit 21 makes a reference to "the mark feature information table" and arranges the feature points of the mark in the predetermined space (for example, invariant feature space). The predetermined space having these feature points arranged therein is shown in FIG. 5. The same figure is a view illustrating a situation in which the segments having the feature points arranged therein are filled-in in a black color.

Figure 6:
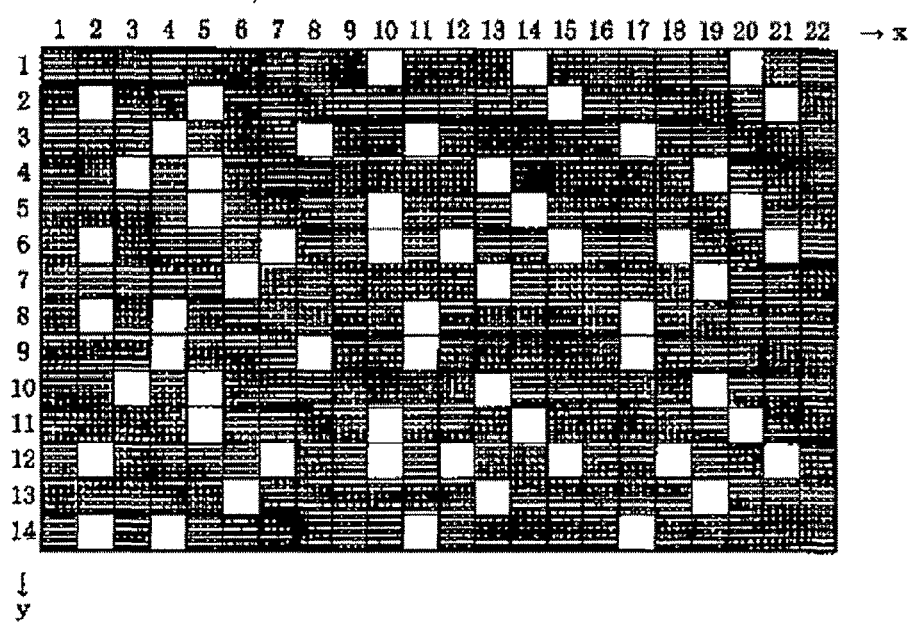
FIG. 6 is a view illustrating the invariant feature space having the unique features arranged therein.

Continuously, the feature comparing unit 21 takes out the coordinates of the unique features from "the unique feature information table". And, the feature comparing unit 21 arranges the unique features in the predetermined space (for example, invariant feature space) according to these coordinates. The predetermined space having these unique features arranged therein is shown in FIG. 6. In the same figure, the segments with a white color are the unique features.

And, the feature comparing unit 21 determines whether or not the whole or one part of the feature points of the mark match with the unique features.

This process may be performed by superposing an arrangement of the unique features shown in FIG. 6 and an arrangement of the feature points shown in FIG. 5 upon each other, and determining whether or not the former matches with the latter. Further, a determination thereof may be made by comparing/collating the coordinate of the feature point of the mark with the coordinate of the unique feature, and determining whether or not the former matches with the latter.

That is, the feature comparing unit 21 arranges the feature points of the mark in the predetermined space having the unique features arranged therein, and selects the feature point of the mark arranged in a segment identical to that of the unique features.

Figure 7:
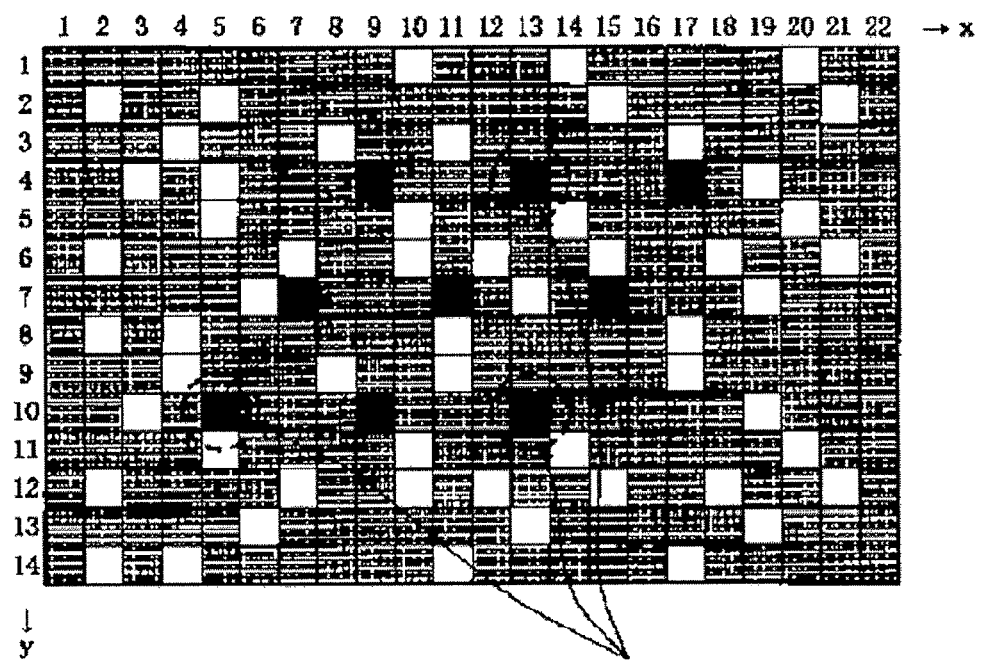
FIG. 7 is a view illustrating the invariant feature space having the invariant feature of the mark and the unique features arranged therein.

A result of this superposition is shown in FIG. 7. With the case shown in the same figure, three feature points, out of nine feature points of the mark, match with the unique features.

And, the feature comparing unit 21 determines whether or not the above mark can be used as the detection marker.

This determination involves, for example, the following methods.

(1) When at least one feature point of the mark (containing the invariant feature of the mark) matches with the unique feature, it is assumed that the above mark can be used as the detection marker.

The unique feature is a portion in which no feature point extracted from the background video image (background pattern) appears. The fact that the feature point appears in the above portion in the detection stage signifies that, in other words, the thing (containing the thing that could become an extraction target of the feature point, for example, one part of the thing, superposition of a plurality of the things, and the design), which did not appear in the background video image, appears in the detection stage. Herein, when the thing, which did not appear in the background video image and yet appears in the detection stage, is limited to the marker, in a case in which the feature point appears in the unique feature, the above thing can be specified as a marker. Thus, when at least one feature point of the mark matches with the unique feature, the above mark can be used as the detection marker.

(2) When the number of the feature points of the mark matching with the unique features is equal to or more than a predetermined number, it is assumed that the above mark can be used as the detection marker.

When the thing, which did not appear in the background video image, and nevertheless, could appear in the detection stage, is not limited to the marker, there is a possibility that the feature point having appeared in the unique feature is a feature point based upon the thing other than the marker. However, even though the feature point is based upon the thing other than the marker, a possibility that the thing, in which the feature points matching with all of a plurality of the unique features are acquired, appears in the detection-targeted video image is very low. On the other hand, the existing mark, in which the invariant features completely matching with all of a plurality of the unique features are acquired, does not exist easily when the number of the unique features is relatively few. Thereupon, at the moment of, while excluding the things other than the mark, being a determination target, determining whether or not the above mark can be used as the detection marker, it is assumed that the above mark can be used as the detection marker when the number of the feature points of the mark matching with the unique features is equal to or more than a predetermined number.

Additionally, "the predetermined number" may be decided arbitrarily. For example, when it is assumed that "the predetermined number" is three, this mark can be used as the detection marker in a result shown in FIG. 7. To the contrary, when it is assumed that "the predetermined number" is four or more, this mark cannot be used as the detection marker in the result shown in FIG. 7.

(3) When a ratio of the number of the feature points of the mark matching with the unique features over the number of the feature points of the mark is equal to more than a predetermined value, it is assumed that the above mark can be used as the detection marker.

For example, as shown in FIG. 7, when the invariant feature number of the mark is nine, and the number of the invariant features matching with the unique features is three, a ratio thereof is "1/3". When "3", being a quotient thereof, is equal to or more than a predetermined value, it is assumed that the above mark can be used as the detection marker.

This method may be used in a case of the viewpoint of (2), that is, in a case in which it is hardly supposed that all of a plurality of the feature points based upon the thing, which did not appear in the background video image and nevertheless could appear in the detection stage, match with the unique features.

(4) When all of a plurality of the feature points based upon the mark match with the unique features, it is assumed that the above mark can be used as the detection marker.

When the number of the unique features is relatively few, a possibility that all feature points of the mark match with unique features is low. To the contrary, when the number of the unique features is many, a possibility that the feature points of the mark match with unique features becomes high.

Further, the more the number of the feature points matching with the unique features, the higher the robustness of the above marker.

Thereupon, a configuration may be made in such a manner that when all of a plurality of the invariant features based upon the mark match with unique features, the above mark can be used as the marker.

Employing any of these methods (1) to (4) makes it possible to determine whether or not the above mark can be used as the detection marker.

Additionally, each of the methods (1) to (4) may be employed not only when the unique features and the feature points of the mark are graphically superposed upon each other, but also when the coordinates of the feature points of the mark and the coordinates of the unique features are numerically compared with each other.

(II) Maker Determination Method

Figure 8:
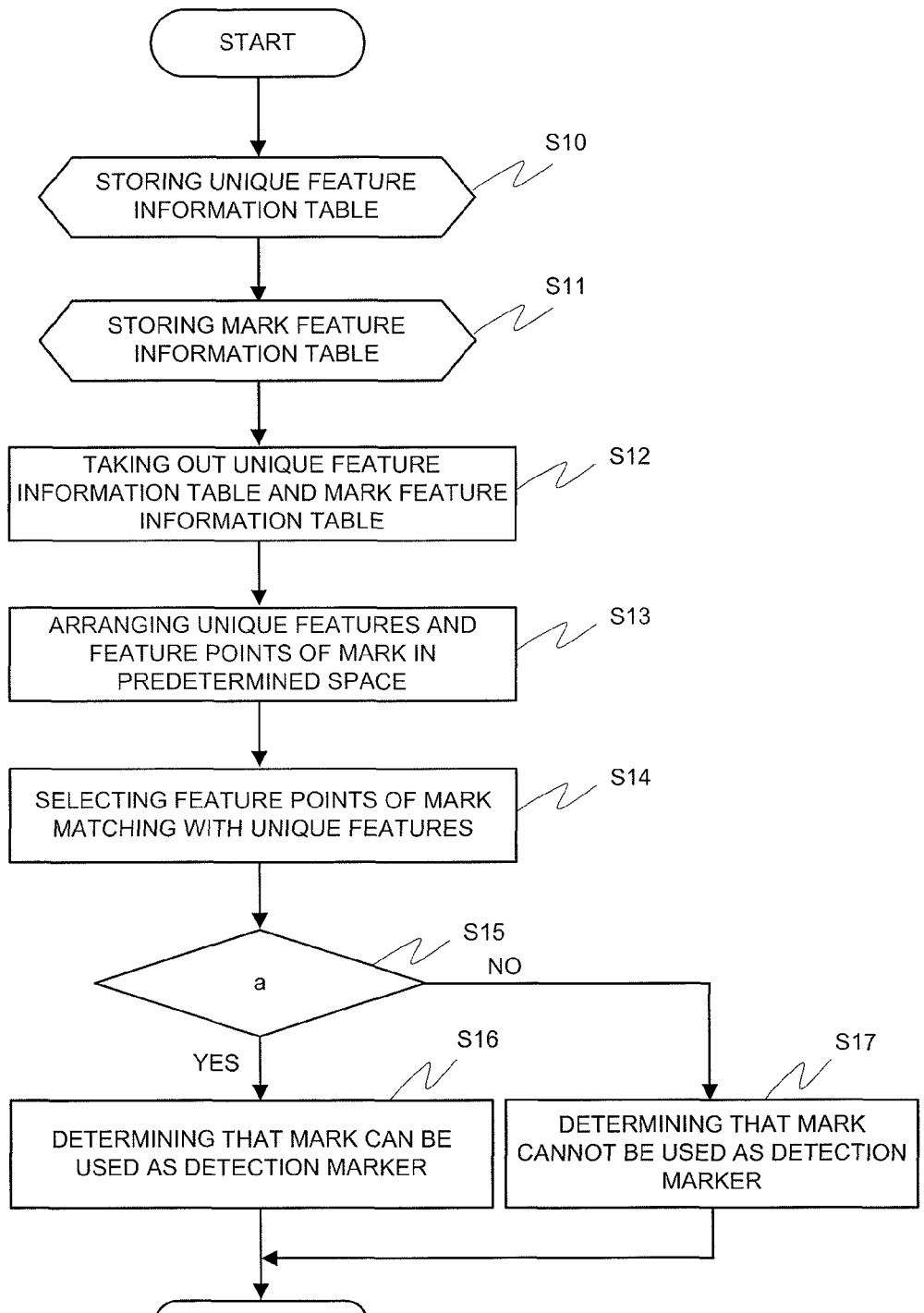
FIG. 8 is a flowchart illustrating an operation of the marker determination device in the first exemplary embodiment of the present invention.

Next, an operation of the marker determination device (marker determination method) of this exemplary embodiment will be explained by making a reference FIG. 8.

The same figure is a flowchart illustrating a predetermined procedure of the marker determination method of this exemplary embodiment.

The unique feature storing unit 11 of the feature storing means 10 stores "the unique feature information table" beforehand (Step 10). Further, the mark feature storing unit 12 of the feature storing means 10 stores "the mark feature information table" beforehand (Step 11).

The feature comparing unit 21 takes out "the unique feature information table" from the unique feature storing unit 11. Further, the feature comparing unit 21 takes out "the mark feature information table" from the mark feature storing unit 12 (Step 12).

In addition, the feature comparing unit 21 arranges each of the feature points shown in "the serial number of the feature point" of "the mark feature information table" in the predetermined space according to the x coordinate shown in "the x coordinate of the feature point" and the y coordinate shown in "the y coordinate of the feature point".

Further, the feature comparing unit 21 takes out the coordinates of the unique features from "the unique feature information table". And, the feature comparing unit 21 arranges the unique features in the predetermined space according to the above coordinates (Step 13).

Next, the feature comparing unit 21 determines whether or not the whole or one part of a plurality of the invariant features based upon the mark match with the unique features.

That is, the feature comparing unit 21 arranges the unique feature in the predetermined space, arranges the feature points of the mark, and selects the feature points of the mark matching with the unique features (Step 14).

And, the feature comparing unit 21 determines whether or not the number of the feature points of the mark matching with the unique features is equal to or more than a predetermined number (Step 15).

When it is equal to or more than a predetermined number as a result of determination, it is determined that the above mark can be used as the detection marker (Step 16).

On the other hand, when it is not equal to or more than a predetermined number, it is determined that the above mark cannot be used as the detection marker (Step 17).

With such a method, it may be determined whether or not the above mark can be used as the detection marker.

As explained above, the marker determination device and the marker determination method of this exemplary embodiment were configured to extract the feature points from the mark, being a determination target, to arrange these feature points in the predetermined space, and to determine whether these feature points match with the unique features. This makes it possible to determine whether or not the existing mark and the mark of which the design has been decided could become a detection target of the marker detection device.

Additionally, while the feature points based upon the mark alone were displayed in the mark feature information table shown in FIG. 4 and the invariant feature space shown in FIG. 5, the feature points are not limited to the feature points based upon the mark alone, and for example, it is also possible to extract the feature points from the background containing the mark, to prepare the mark feature information table about these feature points, to arrange the feature points in the invariant feature space, and to compare the above feature points with the unique features.

The Second Exemplary Embodiment

Next, the second exemplary embodiment of the marker determination device and the marker determination method of the present invention will be explained by making a reference to FIG. 9.

The same figure is a block diagram illustrating a configuration of the marker determination device of this exemplary embodiment.

This exemplary embodiment, as compared with the first embodiment, differs in a point of newly including a video image inputting means and a feature extracting means. Other components are similar to those of the first exemplary embodiment.

Figure 9:
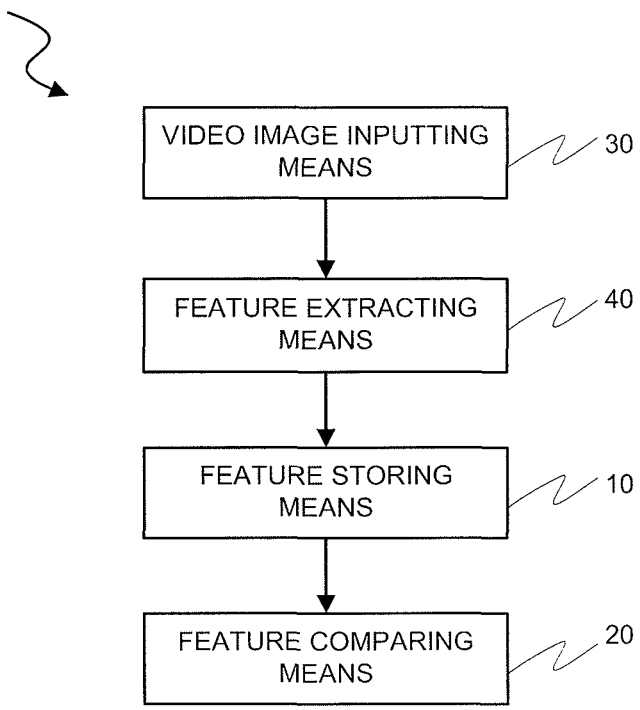
FIG. 9 is a block diagram illustrating a configuration of the marker determination device in a second exemplary embodiment of the present invention.

Thus, in FIG. 9, identical codes are added to the component parts similar to those of FIG. 1, and its detailed explanation is omitted.

(I) Marker Determination Device

As shown in FIG. 9, a marker determination device 1b is provided with a feature storing means 10, a feature comparing means 20, a video image inputting means 30, and a feature extracting means 40.

Figure 10:
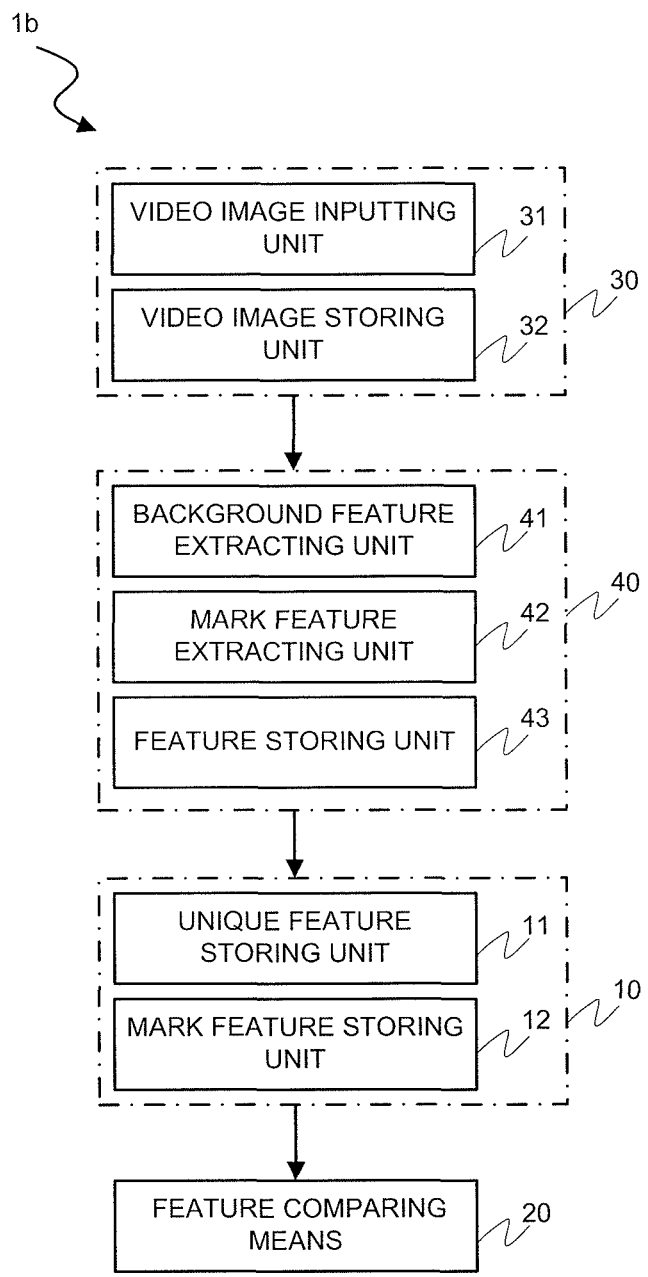
FIG. 10 is a block diagram illustrating a detailed configuration of the marker determination device in the second exemplary embodiment of the present invention.

Herein, the video image inputting means 30 includes a video image inputting unit 31 and a video image storing unit 32 as shown in FIG. 10.

The video image inputting unit 31 images or inputs the background video image.

The background video image is a video image obtained by imaging the environment in which the mark, being a determination target, does not exist. For example, when a belt-conveyer for transporting the object exists, the above background video image is equivalent to a video image obtained by imaging the belt-conveyer in the situation of transporting the object not added with the mark, being a determination target thereof, and its neighbor, or the like.

The above background video image could be a moving image (video image), and further, could be plural pieces of the still images taken at a predetermined time interval.

In addition, the above background video image may include a live video image, a recorded video image, a delivered video image, or the like.

Further, the video image inputting unit 31 may image the mark (the existing mark for which a determination is to be made as to whether or not it is usable as the detection marker), being a determination target, in a single unit (by employing blue back and the like). This imaged video image is referred to as a mark-alone video image.

In addition, the video image inputting unit 31 may image the environment in which the mark, being a determination target, exists. This imaged video image is referred to as a mark environment video image.

Further, the video image inputting unit 31 may hold the imaging device for itself. In this case, the video image inputting unit 31 may image the situation adjacent the location in which the corresponding marker determination device 1b has been mounted as the background video image.

In addition, the video image inputting unit 31 also may input the background video images incorporated by devices other than the corresponding marker determination device 1b via a communication network, a communication cable or the like.

Figure 11:
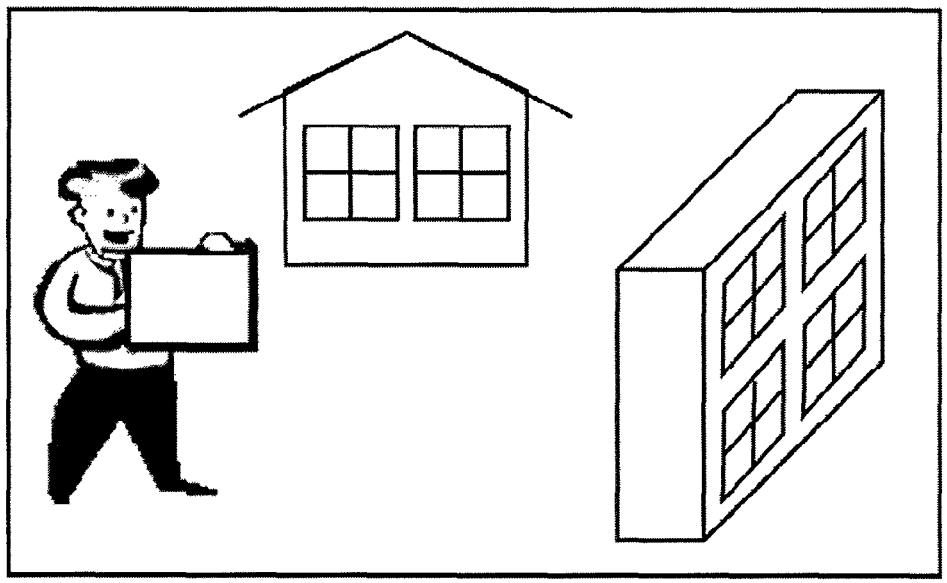
FIG. 11 is a view illustrating an example of the background video image.

An example of the background video image inputted by this video image inputting unit 31 is shown in FIG. 11.

The video image storing unit 32 stores the still image frames constituting the background video image as digitized frame images. The so-called still image frame constituting the background video image, when the image as shown in FIG. 11 exists in a plural number, points to each piece of these images, for example.

Further, the video image storing unit 32 stores the number added to each of a plurality of the frame images (for example, serial number).

In addition, the video image storing unit 32 may also store information specifying a time when the frame image was taken, a device that imaged the frame image, and the like (in a case where the frame image was inputted from the outside).

The feature extracting means 40, as shown in FIG. 10, includes a background feature extracting unit 41, a mark feature extracting unit 42, and a feature storing unit 43.

The background feature extracting unit 41 takes out the frame images from the video image storing unit 32. And, the background feature extracting unit 41 extracts the image features containing characteristic patterns within the taken-out frame images.

The background feature extracting unit 41 may use, for example, a graphically distinctive property in the form of numeric values as the image feature.

Figure 12:
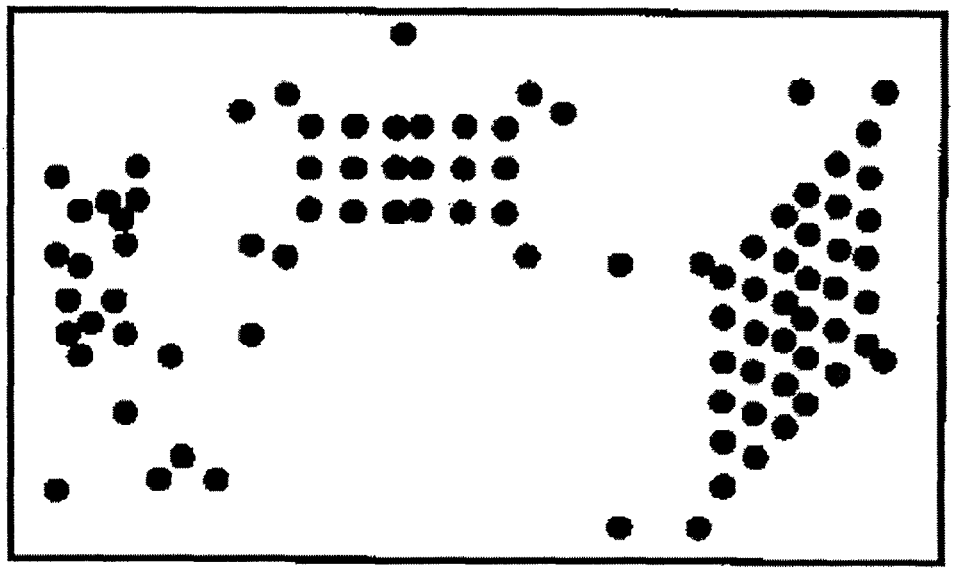
FIG. 12 is a view illustrating the feature space having the feature points arranged therein.

For example, the method disclosed by T. Tommasini, et al. in "Making good features track better" presented in Proceedings of IEEE International Conference on Computer Vision and Pattern Recognition (1998) may be used therefor. This method is capable of extracting vertices of a shape of the object, intersections of linear objects, endpoints, etc. in the image. And, a series of position coordinate information of these points on the image may be defined as graphical features. For example, upon extracting the feature points for the frame image of FIG. 11 with this method, the feature points are arranged in plural number as shown in FIG. 12. The feature points may be managed with the coordinates on a one-by-one basis.

Additionally, the space having the feature points arranged therein is called a feature space. This feature space may be two-dimensional or may be three-dimensional. The feature space of this exemplary embodiment is assumed to be two-dimensional.

Further, as another method, there exists, for example, the method disclosed by Montanari in "On the option detection of curves in noisy pictures," Communications of ACM, 14, 1971. According to this, entries in an R table in which a distance from a reference point and a relative angle are stored may be used as the features. At this moment, by defining the reference point for all feature positions and exhaustively extracting the features, the marker may be made robust against partial loss of the features.

In addition, as another method of extracting the features, for example, there exists the method of using a luminance value or a color difference value of each pixel on the image as the feature.

Figure 13:
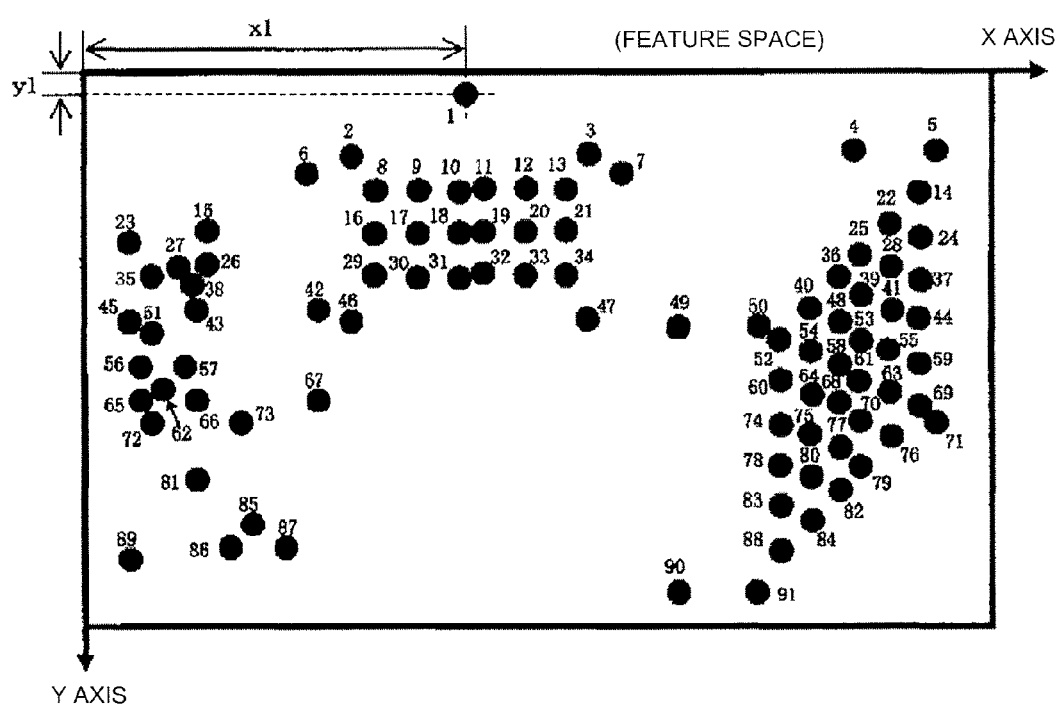
FIG. 13 is a view illustrating the feature space in which the feature points added with the numbers have been arranged.

Next, the background feature extracting unit 41 adds the serial number to each of the feature points as shown in FIG. 13. This serial number may be added in the descending order of the feature point, to being with the highest-ranked feature point, in such a manner of t1, t2, t3, t4, . . . .

Continuously, the background feature extracting unit 41 obtains respective coordinates of the feature points. For the coordinates, as shown in FIG. 13, an X axis and a Y axis may be set in the feature space to define a distance from the Y axis and a distance from the X axis as an X coordinate and a Y coordinate, respectively.

And, the background feature extracting unit 41 causes the feature storing unit 43 to store the serial numbers and the coordinates of these feature points. The feature storing unit 43 may store these serial numbers and the like as "the feature point information table" as shown in FIG. 14.

"The feature point information table", as shown in the same figure, may include "the serial number of the frame image" (A), "the serial number of the feature point" (B), "the x coordinate of the feature point" (C), and "the y coordinate of the feature point" (D) as an item, respectively.

"The serial number of the frame image" is indicative of the number added to the frame image from which the feature points have been extracted.

"The serial number of the feature point" is indicative of the number added to each of a plurality of the feature points. Specifically, "t1" and "t15" of FIG. 13, and the like fall under it.

"The x coordinate of the feature point" is indicative of an x coordinate of the above feature point in the feature space.

"The y coordinate of the feature point" is indicative of a y coordinate of the above feature point in the feature space.

Figure 15:
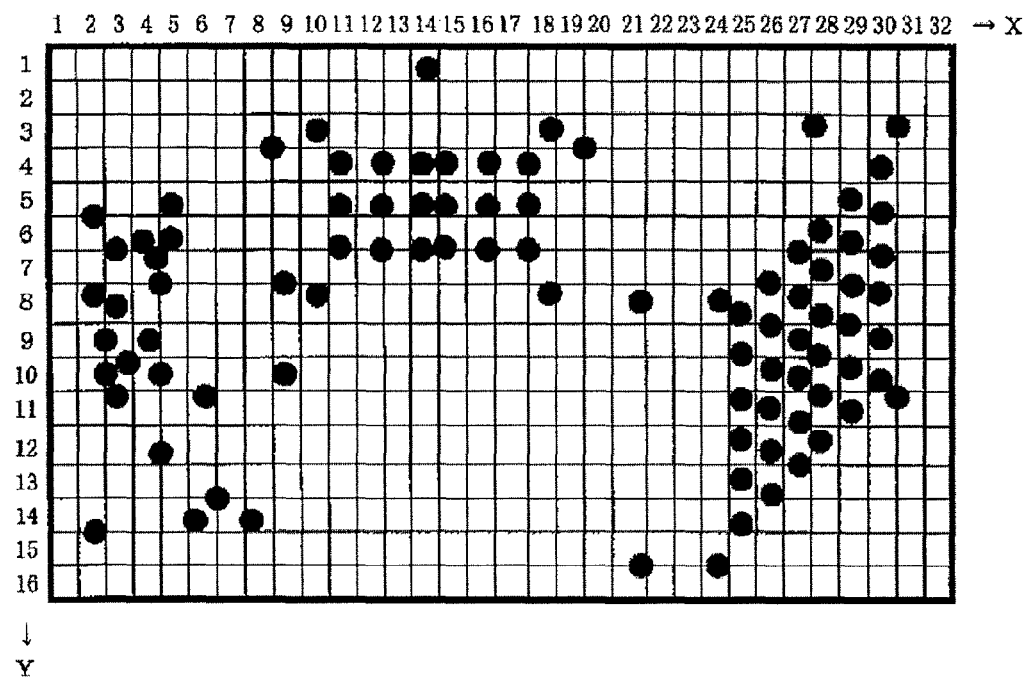
FIG. 15 is a view illustrating the feature space in which the segment lines are drawn.

Next, the background feature extracting unit 41 divides the feature space into a plurality of segments by using grid-shape mesh cells as shown in FIG. 15.

At this moment, the background feature extracting unit 41 calculates the coordinate of each segment. This coordinate of each segment may be displayed by coordinates of lines for separating each segment (segment lines).

For example, as shown in FIG. 16, it is assumed that the coordinates of the separating lines are defined as x1, x2, x3, . . . , y1, y2, y3, . . . .

Further, designations of respective segment are defined as segment (1,1), segment (1,2), segment (1,3), . . . , segment (2,1), segment (2,2), segment (2,3), . . . . Segment (1,1), out of them, is a scope encircled by the coordinate (0,0)-(x1,0)-(x1,y1)-(0,y1)-(0,0).

Herein, x1 is an x coordinate of the first-place segment line in the X direction. Further, y1 is a y coordinate of the first-place segment line in the Y direction. With this, the coordinate of segment (1,1) may be displayed as (x1,y1) as shown in FIG. 17.

Likewise, the coordinate of segment (2,1), the coordinate of segment (3,1), the coordinate of segment (1,2), and the coordinate of segment (2,2) may be displayed as (x2,y1), (x3,y1), (x1,y2), and (x2,y2), respectively.

A relationship between the designation and the coordinate of each segment is shown in FIG. 17. The background feature extracting unit 41 may cause the feature storing unit 43 to store these designations and the coordinates of respective segments as a segment coordinate table.

Further, size of one segment may be arbitrarily set. However, size of one segment is desirably decided in such a manner that at least two segments or more in which no feature point exists exist within the feature space.

Continuously, the background feature extracting unit 41 obtains the number of the feature points for each segment.

This calculation of the number of the by-segment feature points may be performed by employing the coordinate of each segment and the coordinate of each feature point.

The calculated numbers of the by-segment feature points, as shown in FIG. 18, may be displayed as a feature point number distribution diagram (frequency distribution). This "feature point number distribution diagram" is stored in the feature storing unit 43.

Additionally, in FIG. 18, so as to make the explanation easily understandable, the segments in which one feature point or more exists are shaded in a gray color.

Further, the background feature extracting unit 41 selects the segments in which the number of the feature points is zero, or is equal to or less than a predetermined number as the unique features. For example, the background feature extracting unit 41 selects (x1,y1), (x2,y1), (x3,y1) and the like as the unique features in the feature point number distribution diagram shown in FIG. 18.

And, the background feature extracting unit 41 prepares "the unique feature information table" indicative of the coordinates of the selected unique features (see FIG. 3). The background feature extracting unit 41 causes the unique feature storing unit 11 of the feature storage 10 to store this unique feature information table.

The mark feature extracting unit 42 extracts the feature points based upon the video image of the mark inputted by the video image inputting unit 31.

Figure 19:
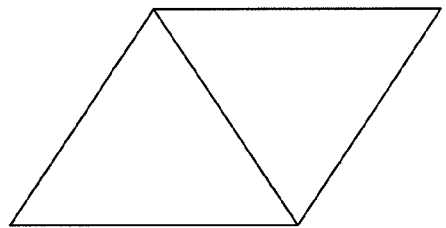
FIG. 19 is a view illustrating the design of the determination-target mark.

For example, it is assumed that the above inputted mark has a design (shape) as shown in FIG. 19. The mark feature extracting unit 42 extracts the feature points from the above mark. The method of this extraction is identical to the extraction method to be executed by the background feature extracting unit 41.

Figure 20:
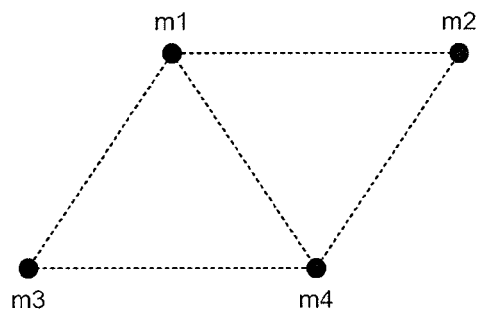
FIG. 20 is a view illustrating the feature points extracted from the mark shown in FIG. 19.

The feature points extracted by the mark feature extracting unit 42 from the mark shown in FIG. 19 are displayed as shown in FIG. 20.

Figure 21:
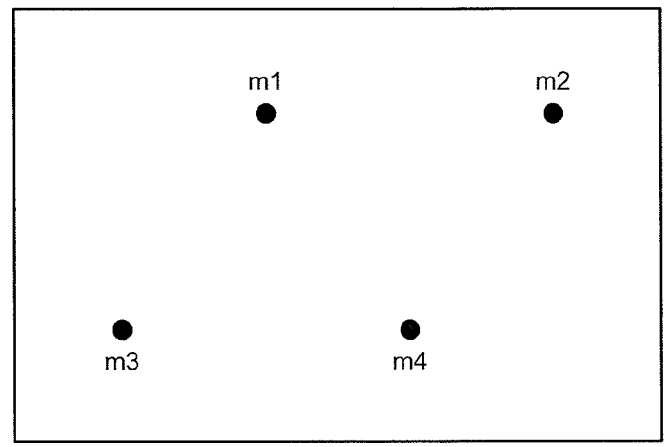
FIG. 21 is a view illustrating the feature space having the feature points arranged therein.

Further, the mark feature extracting unit 42 arranges the extracted feature points in the feature space. The feature space having these feature points arranged therein is shown in FIG. 21.

And, the mark feature extracting unit 42 calculates the coordinate of each feature point in the feature space. The mark feature extracting unit 42 puts together these calculated coordinates of the feature points as "the mark feature information table" (see FIG. 4). This "mark feature information table" is stored in the mark feature storing unit 12 of the feature storing means 10.

The feature storing unit 43 stores "the feature point information table", "the segment coordinate table", and "the feature point number distribution diagram".

The feature storing means 10 includes a unique feature storing unit 11 and a mark feature storing unit 12 as shown in FIG. 10.

The unique feature storing unit 11 stores "the unique feature information table".

The mark feature storing unit 12 stores "the mark feature information table".

The feature comparing means 20 includes a feature comparing unit 21 and a comparison result storing unit 22.

Figure 22:
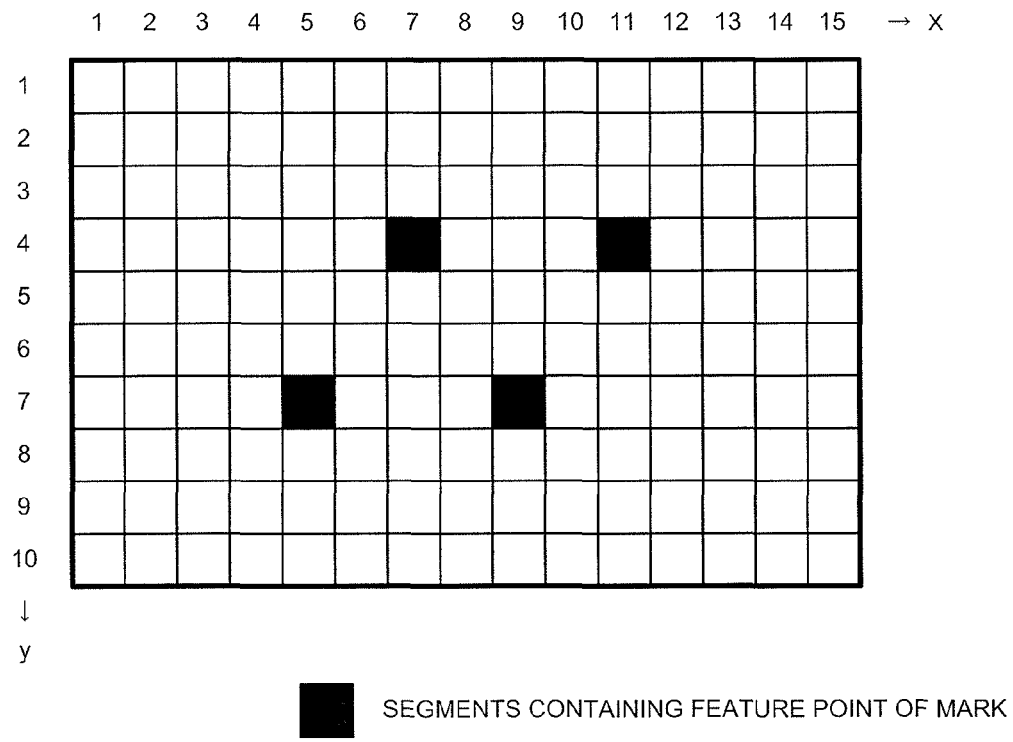
FIG. 22 is a view illustrating the feature space having the feature points of the mark arranged therein.

The feature comparing unit 21 arranges the feature points shown in "the mark feature information table" in the feature space. Further, the feature comparing unit 21 divides the feature space having the feature points of the mark arranged therein into a plurality of the segments by adding the segment lines hereto. In addition, the feature comparing unit 21 specifies the segments in which the number of the feature points is equal to or more than a predetermined number ("1" in this exemplary embodiment). These specified segments are shown in FIG. 22. In the same figure, the segments filled-in in black are segments in which the number of the feature points is equal to or more than the predetermined number.

Figure 23:
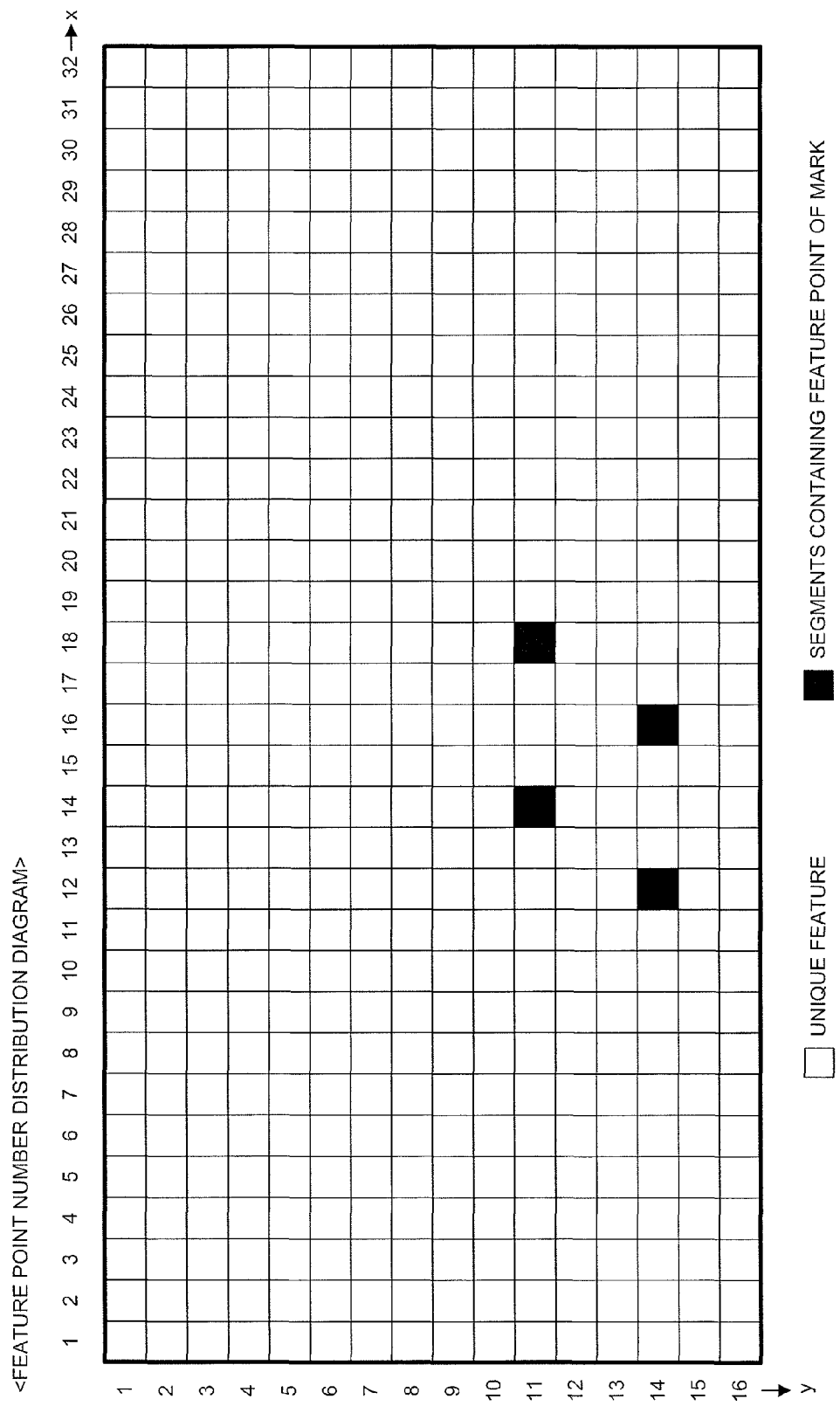
FIG. 23 is a view illustrating a feature point number distribution diagram having the feature points of the mark and the unique features arranged therein.

Further, the feature comparing unit 21 arranges the unique features shown in "the unique feature information table" in the feature space. In addition, the feature comparing unit 21 arranges the feature points of the mark in the above feature space. A situation of this arrangement is shown in FIG. 23.

In the same figure, the segments with a white color are indicative of segments having the unique features arranged therein, the segments with a gray color are indicative of segments having no unique feature arranged therein, and the segments with a black color are indicative of segments having the feature points of the mark arranged therein.

Additionally, in the same figure, the number of the segments (segments with a white color) having the unique feature arranged therein is larger than that of the segments (segments with a gray color) having no unique feature arranged therein. The reason is that the original image is an image as shown in FIG. 11, and the number of the extracted feature points is few. If the feature points are extracted more numerously from the entirety of the image, the number of the segments with a gray color becomes many and the number of the unique features becomes few.

In addition, the feature comparing unit 21 selects the feature points of the mark matching with the unique features.

In the same figure, all feature points of the mark match with the unique features. In this case, the feature comparing unit 21 determines that the above mark can be used as the detection marker because the number of the feature points matching with the unique features is equal to or more than a predetermined number.

The comparison result storing unit 22 stores a result of the determination by the feature comparing unit 21.

(II) Maker Determination Method

Next, an operational procedure of the marker determination device (marker determination method) will be explained by making a reference FIG. 24.

Figure 24:
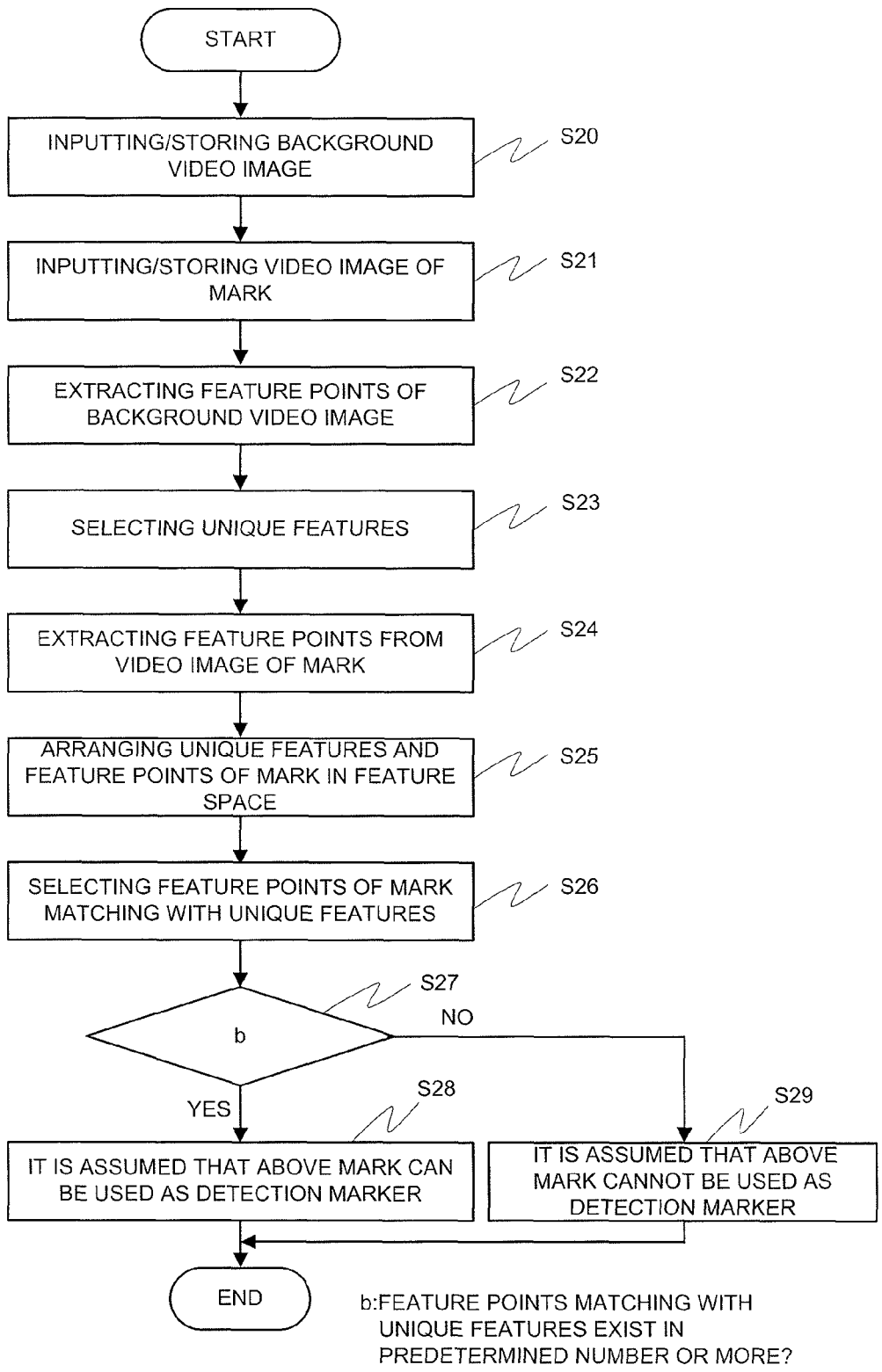
FIG. 24 is a flowchart illustrating an operation of the marker determination device in the second exemplary embodiment of the present invention.

FIG. 24 is a flowchart illustrating a processing procedure of the marker determination method.

In the marker determination device 1b, the video image inputting unit 31 of the video image inputting means 30 images (or inputs) the background video image (Step 20). This background video image may be configured of plural pieces of the frame images. The video image storing unit 32 of the video image inputting means 30 stores the background video image inputted by the video image inputting unit 31 as the frame image.

Further, the video image inputting unit 31 images (or inputs) the video image of the mark, being a determination target (Step 21). The video image storing unit 32 stores the video image of the mark inputted by the video image inputting unit 31.

The background feature extracting unit 41 of the feature extracting means 40 takes out the frame images from the video image storing unit 32, and extracts the feature points from these frame images (Step 22).

Further, the background feature extracting unit 41 arranges these feature points in the feature space. And, the background feature extracting unit 41 calculates the coordinates of the feature points in the feature space. These calculated coordinates are put together into "the feature point information table", and stored in the feature storing unit 43.

Next, the background feature extracting unit 41 divides the feature space into a plurality of segments by using grid-shape mesh cells. Continuously, the background feature extracting unit 41 obtains the number of the feature points for each segment, and selects the segments in which the number of the feature points is zero, or equal to or less than a predetermined number as the unique features (Step 23).

And, the background feature extracting unit 41 prepares "the unique feature information table" indicative of the coordinates of the selected unique features. The unique feature storing unit 11 of the feature storing means 10 stores "the unique feature information table".

The mark feature extracting unit 42 of the feature extracting means 40 takes out the image of the mark coming from the video image storing unit 32, and extracts the feature points from this image of the mark (Step 24).

Further, the mark feature extracting unit 42 arranges these feature points in the feature space. And, the mark feature extracting unit 42 calculates the coordinates of the feature points in the feature space. These calculated coordinates are put together into "the mark feature information table", and stored in the mark feature storing unit 12 of the feature storing means 10.

The feature comparing unit 21 of the feature comparing means 20 takes out "the unique feature information table" from the unique feature storing unit 11. Further, the feature comparing unit 21 takes out "the mark feature information table" from the mark feature storing unit 12.

Next, the feature comparing unit 21 makes a reference to "the unique feature information table" and arranges the unique features in the feature space. Further, the feature comparing unit 21 makes a reference to "the mark feature information table" and arranges the feature points of the mark in the above feature space (Step 25). And, the feature comparing unit 21 selects the feature points of the mark matching with the unique features (Step 26).

Continuously, the feature comparing unit 21 determines whether or not the number of the selected feature points of the mark is equal to or more than a predetermined number (Step 27).

When the number of the selected feature points of the mark is equal to or more than a predetermined number as a result of determination, it is assumed that the above mark can be used as the detection marker (Step 28).

On the other hand, when the number of the feature points of the selected mark is less than a predetermined number, it is assumed that the above mark cannot be used as the detection marker (Step 29).

As explained above, the marker determination device and the marker determination method of this exemplary embodiment were configured to extract the feature points from the mark, being a determination target, to arrange these feature points in the feature space, and to determine whether these feature points match with the unique features. This makes it possible to determine whether or not the existing mark and the mark of which the design has been decided could become a detection target of the marker detection device.

Additionally, while the feature points arranged in the feature space shown in FIG. 22 and the feature points of the mark shown in FIG. 23 are feature points based upon the mark alone, respectively, the feature point is not limited to the feature point based upon the mark alone, and for example, it is also possible to extract the feature points from the background containing the mark, to arrange these feature points in the feature space, and to compare these feature points with the unique features. Also in this case, when the segments containing the feature points of the mark match with the unique features, it may be determined that the above mark can be used as the detection marker.

The Third Exemplary Embodiment

Next, the third exemplary embodiment of the marker determination device and the marker determination method of the present invention will be explained by making a reference to FIG. 25.

The same figure is a block diagram illustrating a configuration of the marker determination device of this exemplary embodiment.

This exemplary embodiment, as compared with the first embodiment, differs in a point of newly including a video image inputting means, a feature extracting means, and an invariant feature converting means. Other components are similar to those of the first exemplary embodiment.

Figure 25:
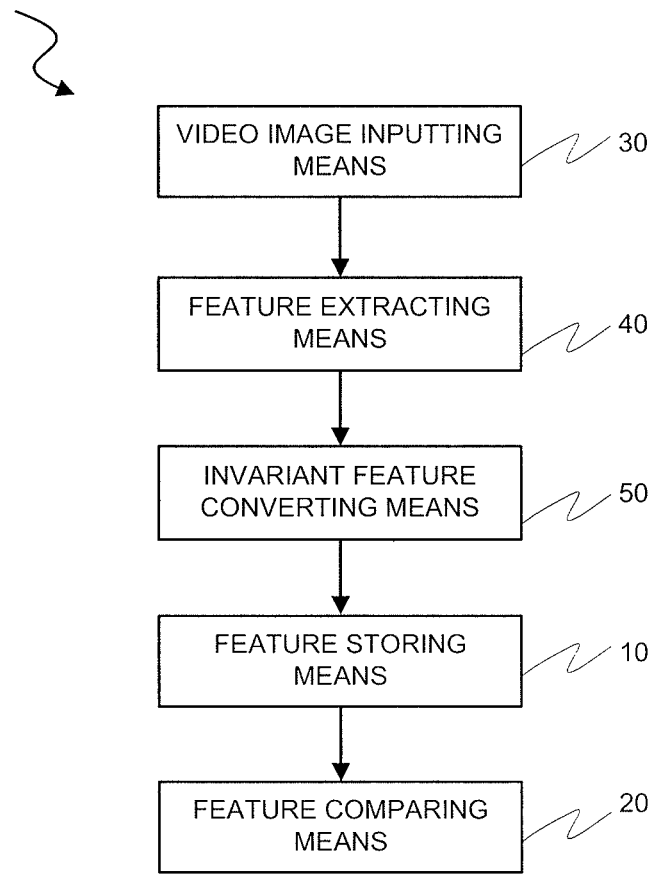
FIG. 25 is a block diagram illustrating a configuration of the marker determination device in the third exemplary embodiment of the present invention.

Thus, in FIG. 25, identical codes are added to the component parts similar to those of FIG. 1, and its detailed explanation is omitted.

(I) Marker Determination Device

As shown in FIG. 25, a marker determination device 1c is provided with a feature storing means 10, a feature comparing means 20, a video image inputting means 30, a feature extracting means 40, and an invariant feature converting means 50.

Figure 26:
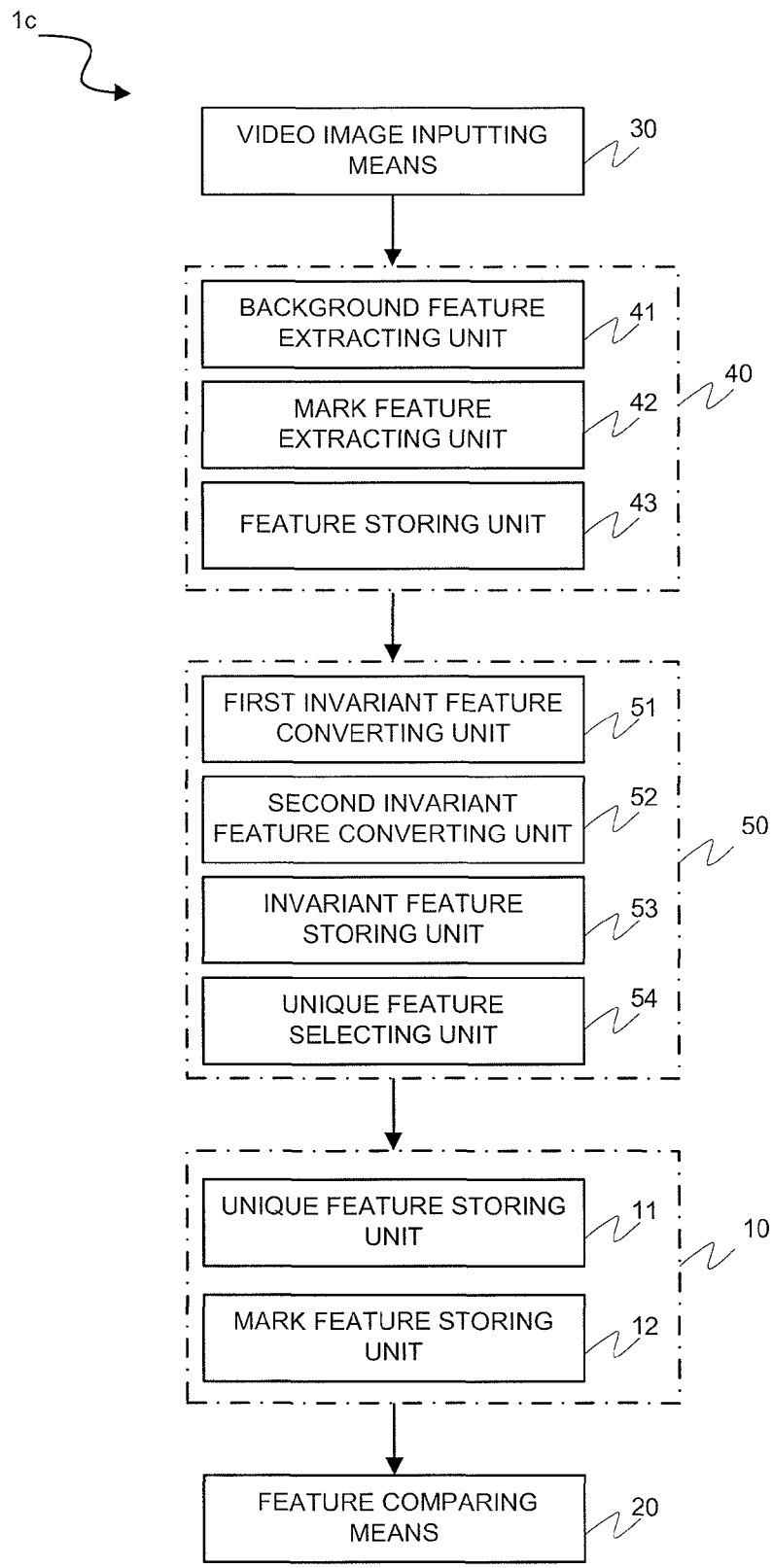
FIG. 26 is a block diagram illustrating a detailed configuration of the marker determination device in the third exemplary embodiment of the present invention.

Herein, the feature extracting means 40 includes a background feature extracting unit 41, a mark feature extracting unit 42 and a feature storing unit 43 as shown in FIG. 26.

The background feature extracting unit 41 takes out the frame images from the video image storing unit 32, and extracts the image features containing the characteristic pattern within this frame image.

Next, the background feature extracting unit 41 adds the serial number to each of the feature points as shown in FIG. 13. Continuously, the background feature extracting unit 41 obtains the coordinate of each feature point.

And, the background feature extracting unit 41 puts together these serial numbers and coordinates of the feature points as "the feature point information table" and causes the feature storing unit 43 to store it.

The mark feature extracting unit 42 extracts the feature points based upon the video image of the mark inputted by the video image inputting unit 31. Further, the mark feature extracting unit 42 arranges the extracted feature points in the feature space. The feature space having these feature points arranged therein is similar to one shown in FIG. 21.

In addition, the mark feature extracting unit 42 calculates the coordinate of each feature point in the feature space. The mark feature extracting unit 42 puts together these calculated coordinates of the feature points into "the mark feature information table" (see FIG. 4). This "mark feature information table" is stored in the mark feature storing unit 12 of the feature storing means 10.

The feature storing unit 43 stores "the feature point information table".

The invariant feature converting means 50, as shown in FIG. 26, includes a first invariant feature converting unit 51, a second invariant feature converting unit 52, an invariant feature storing unit 53, and a unique feature selecting unit 54.

The first invariant feature converting unit 51 converts the feature points into the invariant features. This first invariant feature converting unit 51 takes out "the feature point information table" from the feature storing unit 43 of the feature extracting means 40, converts the feature points thereof into the invariant features, and causes the invariant feature storing unit 53 to store them.

With the case of extracting a distinctive segment in an image and defining a series of position coordinate information on the above image as a graphical feature (for example, with the case of a process of extracting the feature points shown in FIG. 12 from the background video image shown in FIG. 11), conversion thereof into the invariant feature may conducted in a manner as described below, for example. For convenience, the series of the position coordinate information are referred to as feature point groups herein. For simplification, a geometrical invariant feature in a faraway background will be explained. However, consideration should be given so that a feature quantity is invariant even when an effect of optical distortion may cause shear deformative distortion in the image. However, it is easy to extend the invariant feature to that having a higher freedom degree in a case in which the background is not far away, or the like. One exemplary method of generating a geometrical invariant feature from the positional relationship between the feature point groups will be explained, wherein the geometrical invariant feature is a feature quantity that is invariable irrespective of a change in the relative positional relationship resulting in the shear deformative distortion when a camera and a scene, being a to-be-imaged target, are rotated and translated relative to each other.

Three arbitrary feature points are selected from the feature point groups. On the other hand, the invariant feature space is defined as a two-dimensional plane spanned by two orthogonal axes. One of the feature points selected from the feature point groups is caused to correspond to an origin in the invariant feature space. Two other points are caused to correspond to position coordinates (1,0) and (0,1) in the invariant feature space, respectively. These three points are referred to as bases herein below. At that time, a one-to-one linear map from the original image space to the invariant feature space may be defined as an affine transform. All feature point groups except the bases are mapped onto the invariant feature space by employing the same affine transform characterized by the bases, whereupon these feature point groups are invariant irrespective of the relative positional relationship between the camera and the scene. In practice, however, it is necessary to select the bases from all permutations and combinations of three of the feature point groups, and map non-basis feature points with respect to each basis onto the invariant feature space because not always the identical bases can be selected from the scenes.

All bases created in such a manner and the maps of all feature points onto the invariant feature space are stored in the invariant feature storing unit 53 as the invariant features. The reason why these feature point groups are invariant against the geometrical deformation is that the bases selected from the marker allow the resulting invariant feature to match in the video image containing other objects at any time.

While the technique of defining the number of the bases as three was explained until this, the number of the bases is not limited to three, and the number of the bases could be 1, 2, or four or more. Next, the technique of defining the number of the bases as one (1) will be explained.

It is assumed that the feature points extracted from a certain frame image, as shown in FIG. 12, are arranged in the feature space. Further, it is assumed that the serial number is added to each feature point as shown in FIG. 13.

The first invariant feature converting unit 51 decides one feature point as the basis, moves this feature point so that it comes to a location of coordinate (0,0) on the invariant feature space, obtains this movement amount, and moves all other feature points as well to the invariant feature space by the above movement amount.

Figure 27:
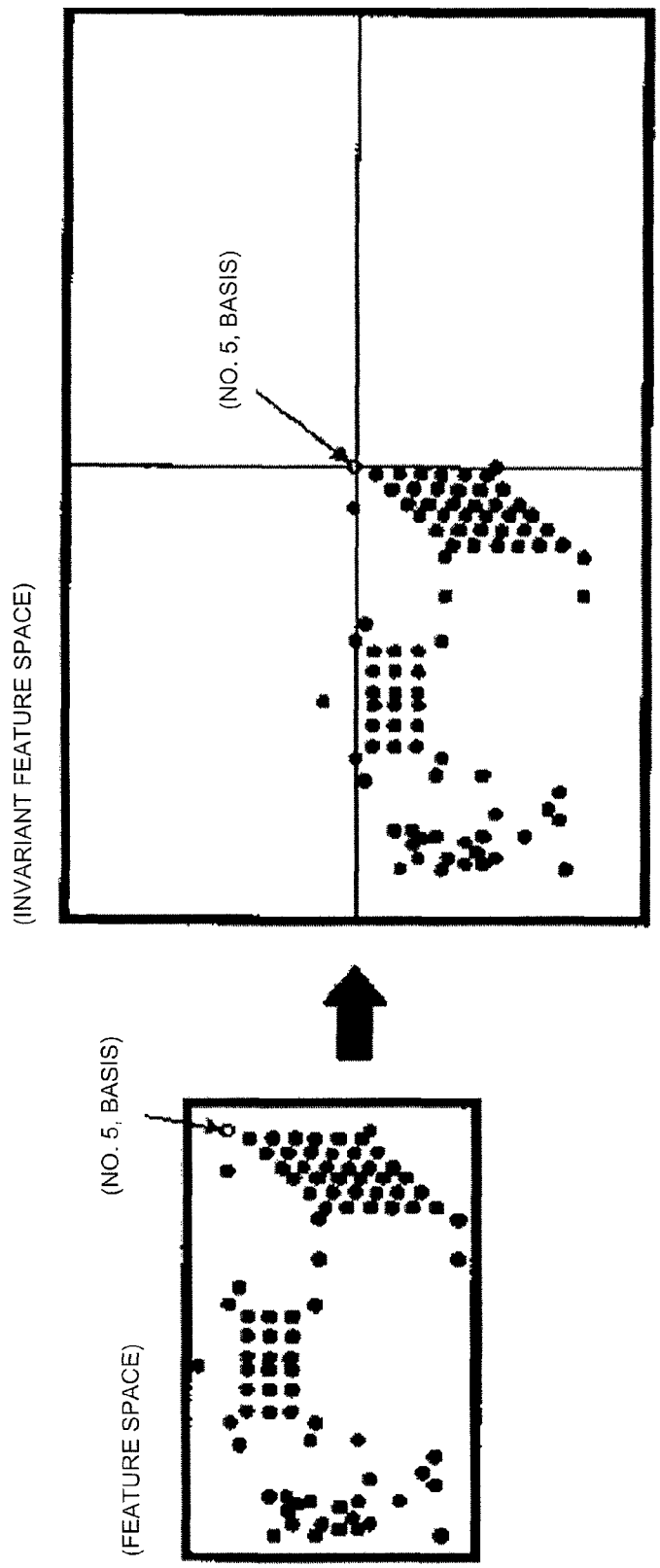
FIG. 27 is a view illustrating a situation in which respective feature points are mapped onto the invariant feature space with a feature point No. 5 defined as a basis.

For example, as shown in FIG. 27, the invariant feature converting unit 51 defines the feature point with the serial No. 5 as the basis, and translates all feature points so that this feature point with No. 5 comes to a location of coordinate (0, 0) in the invariant feature space. This allows the feature points to be arranged in the invariant feature space as shown in the right of the same figure. Additionally, the feature point arranged in the invariant feature space is referred to as an invariant feature.

Figure 28:
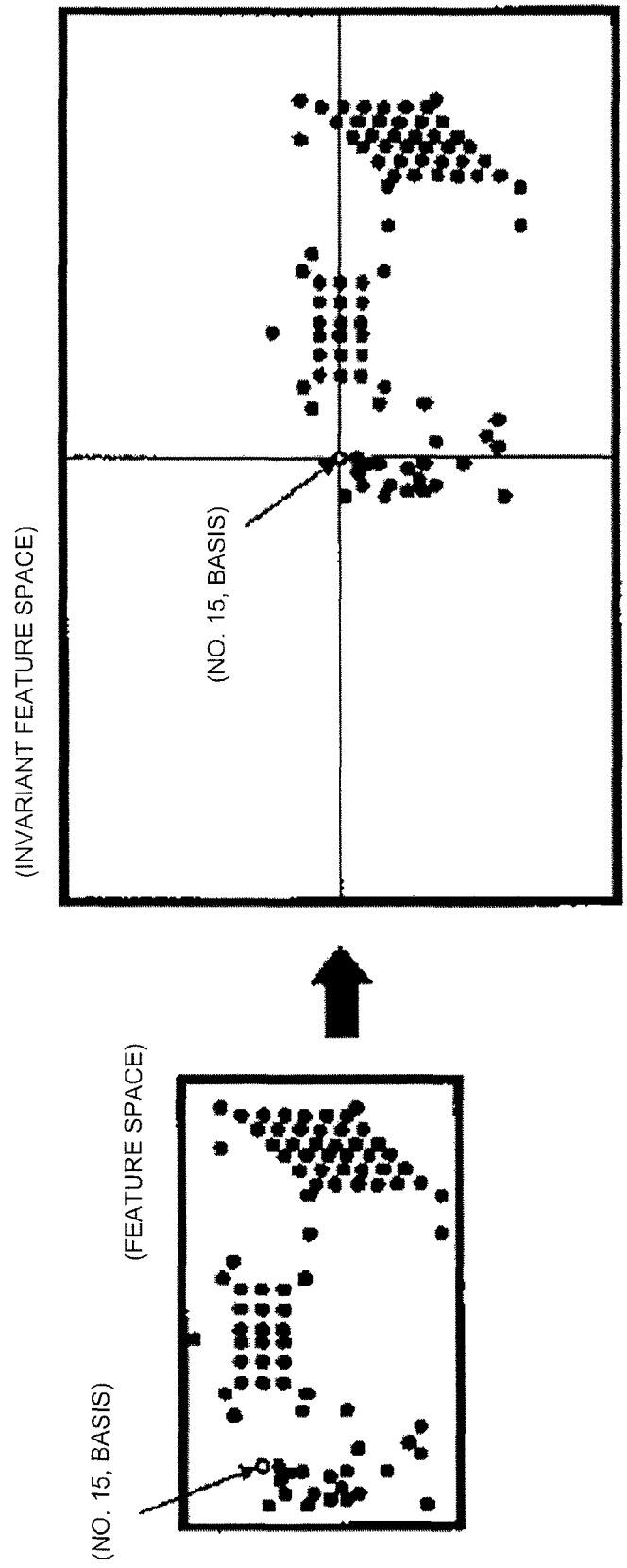
FIG. 28 is a view illustrating a situation in which respective feature points are mapped onto the invariant feature space with a feature point No. 15 defined as a basis.

Further, as shown in FIG. 28, when the invariant feature converting unit 51 defines the feature point with serial No. 15 as the basis, and translates all feature points so that the feature point with No. 15 comes to a location of coordinate (0, 0) in the invariant feature space, the invariant feature group is arranged as shown in the invariant feature space of the right of the same figure.

Figure 29:
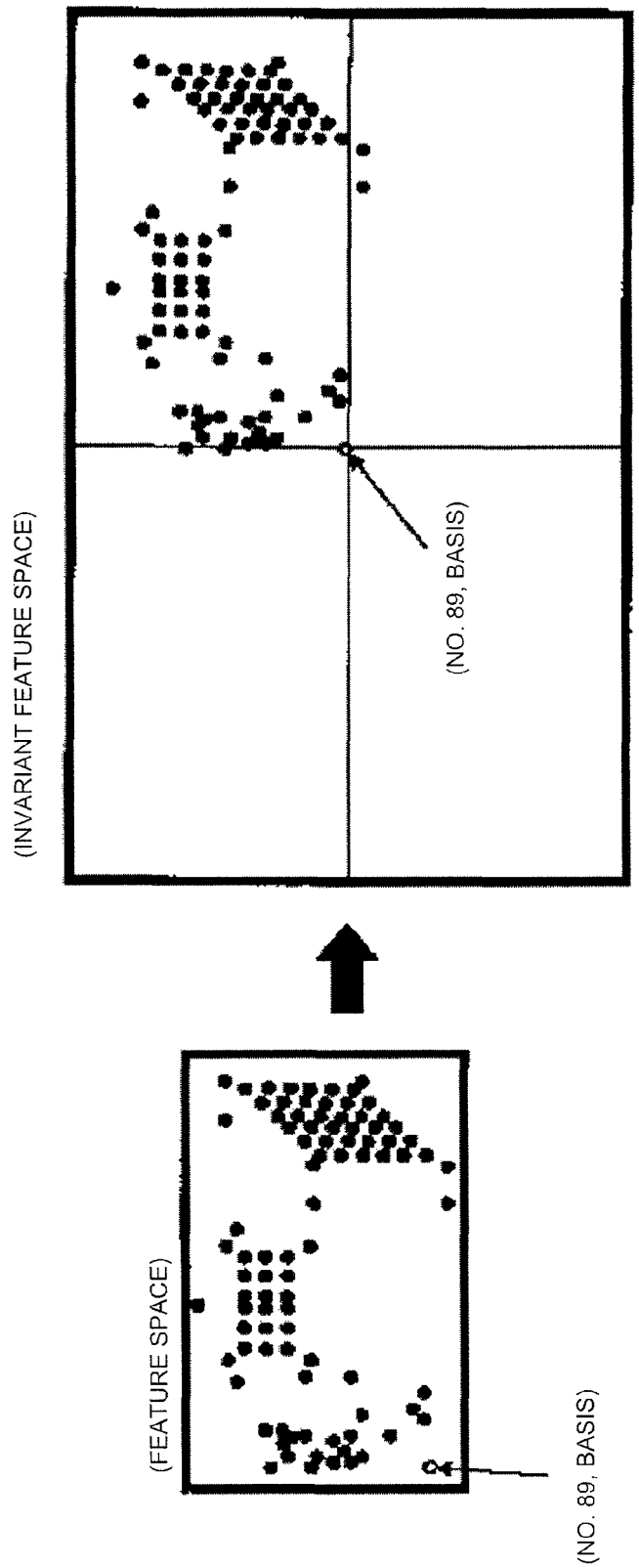
FIG. 29 is a view illustrating a situation in which respective feature points are mapped onto the invariant feature space with a feature point No. 89 defined as a basis.

In addition, as shown in FIG. 29, when the invariant feature converting unit 51 defines the feature point with serial No. 89 as the basis, and translates all feature points so that this feature point with No. 89 comes to a location of coordinate (0, 0) in the invariant feature space, the invariant feature group is arranged as shown in the invariant feature space of the right of the same figure.

Figure 30:
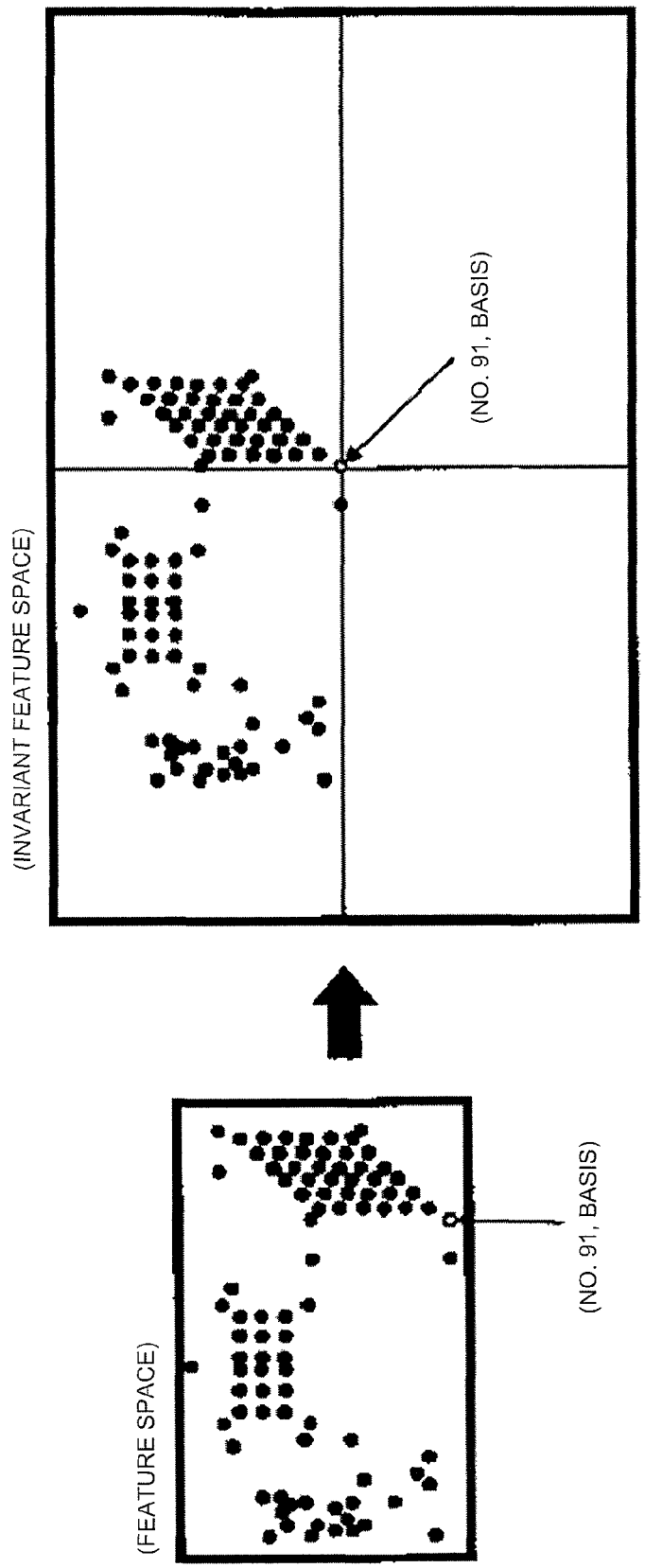
FIG. 30 is a view illustrating a situation in which respective feature points are mapped onto the invariant feature space with a feature point No. 91 defined as a basis.

And, as shown in FIG. 30, when the invariant feature converting unit 51 defines the feature point with serial No. 91 as the basis, and translates all feature points so that this feature point with No. 91 comes to a location of coordinate (0, 0) in the invariant feature space, the invariant feature group is arranged as shown in the invariant feature space of the right of the same figure.

In such a manner, the invariant feature converting unit 51 maps the feature points onto the invariant feature space by performing a process of deciding one feature point as the basis, moving this basis to an origin of the invariant feature space, and moving all feature points by a movement amount identical to the above amount, accompanied with this, whenever sequentially deciding each feature point as the basis, and superposing these moved feature points.

Figure 31:
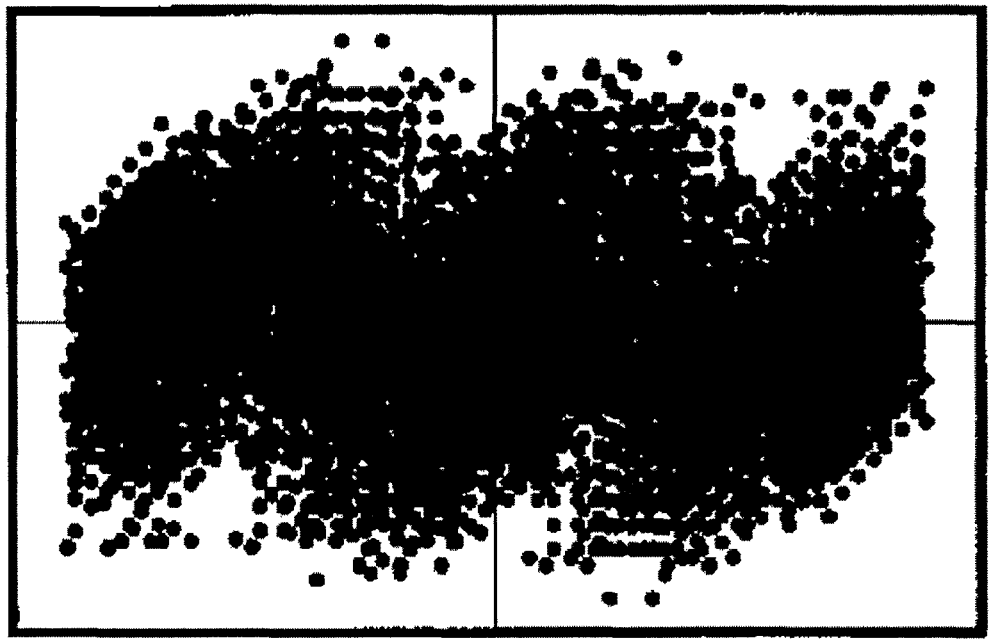
FIG. 31 is a view illustrating a situation in which all feature points shown in FIG. 12 are mapped onto the invariant feature space.

A result of having mapped the feature points shown in FIG. 12 onto the invariant feature space is one shown in FIG. 31. This is a situation in which the invariant features have been arranged in the invariant feature space.

Additionally, while as a method of mapping the feature points onto the invariant feature space, the method shown in FIG. 27 to FIG. 31 are employed in this exemplary embodiment, the mapping method is not limited to these methods, and various methods may be employed.

For example, one feature point of a plurality of the feature points and another feature point are defined as a first basis and a second basis, respectively, the first basis and the second basis are moved to coordinate (0, 0) and coordinate (0, 1) of the invariant feature space, respectively, and all other feature points are moved according to a conversion rule identical to this movement rule, accompanied with this, and the coordinate of each feature point (invariant feature) subjected to the movement in the invariant feature space is stored. Continuously, the other two feature points are defined as a first basis and a second basis, respectively, the first basis and the second basis are moved, all feature points are moved according to the identical conversion rule, accompanied with this, and the coordinates of the invariant features in the invariant feature space are stored. And, when all feature points are decided to be either the first basis or the second basis, and accumulation of the coordinates of the invariant features in the invariant feature space is completed, the mapping onto the invariant feature space is finished.

Further, while the above explanation of the operation was made on the geographical invariant, several kinds of invariants other than the geographical invariant may be used.

For example, an object color may be employed as the invariant.

The color of an object may vary in imaging even the object is same, dependent upon the color of the light source present on the imaging environment. When an influence of a fluctuation in the light source color can be separated and removed from the image, the actual object color can be obtained. The actual object color to be obtained may be used as the object-color invariant. A portion exhibiting specular reflection is principally affected by the light source color, and the luminance value tends to saturation for the light source color component so that the component may be regarded as the light source color to prevent the color component corresponding to the saturated portion from being selected as the invariant feature.

Besides, the methods of estimating the object color from the image that may be employed include a method by Robby T. Tan and Katsushi Ikeuchi, disclosed in "Separating Reflection Components of Textured Surfaces Using a Single Image" IEEE TRANSACTIONS ON PATTERN ANALYSIS AND MACHINE INTELLIGENCE, VOL. 27, NO. 2, FEBRUARY 2005, PP. 178-193, a method by Graham D. Finlayson, Steven D. Hordley, Cheng Lu, and Mark S. Drew disclosed in "On the Removal of Shadows from Images", IEEE TRANSACTIONS ON PATTERN ANALYSIS AND MACHINE INTELLIGENT, VOL. 28, NO. 1, JANUARY 2006, PP. 59-68, and the like.

In addition, a texture may be employed as the invariant.

A luminance distribution for a partial region in the image is subjected to numerical computation, and the resulting numerical value or vector is defined as a feature quantity. Similarly to the graphical invariant, the texture invariant is susceptible to an influence of the relative positional relationship between the camera and the to-be-imaged target, and thus, the feature quantity insusceptible to this influence is calculated and defined as a texture invariant. For example, the feature quantity invariable against a distance between the camera and the target or a zoom may be implemented by converting a partial image of interest into polar coordinates and taking a power spectrum in the radius direction. In addition, the power spectrum may be taken again with respect to the above-power spectrum in the azimuthal direction to obtain the feature quantity that is invariable against the rotation around an optical axis of the camera. Besides, the method by Chi-Man Pun and Moon-Chuen Lee disclosed in "Log-Polar Wavelet Energy Signatures for Rotation and Scale Invariant Texture Classification" IEEE TRANSACTIONS ON PATTERN ANALYSIS AND MACHINE INTELLIGENCE, VOL. 25, NO. 5, May 2003, or the like may be employed.

Further, with regard to the geometrical invariant, another kind of the geometrical invariant such as that by Richard Hartley and Andrew Zisserman disclosed in "Multiple View Geometry in Computer Vision" may be also employed. When the same scene is observed by a plurality of cameras, the method disclosed in this literature enables information on a distance or a relative positional relationship in the depth direction to be acquired, and in this case, when four points lying in non-identical planes are selected as the bases and the invariant feature space is assumed to be three-dimensional, a three-dimensional geometric invariant may be created. At this moment, a conversion map is obtained in which one of four bases selected from the feature point groups is caused to correspond to an origin of the invariant space, and the feature points of the other bases are caused to correspond to position coordinates (1,0,0), (0,1,0) and (0,0,1) in the invariant space, and this conversion map is used to map the other features onto the invariant space.

Figure 32:
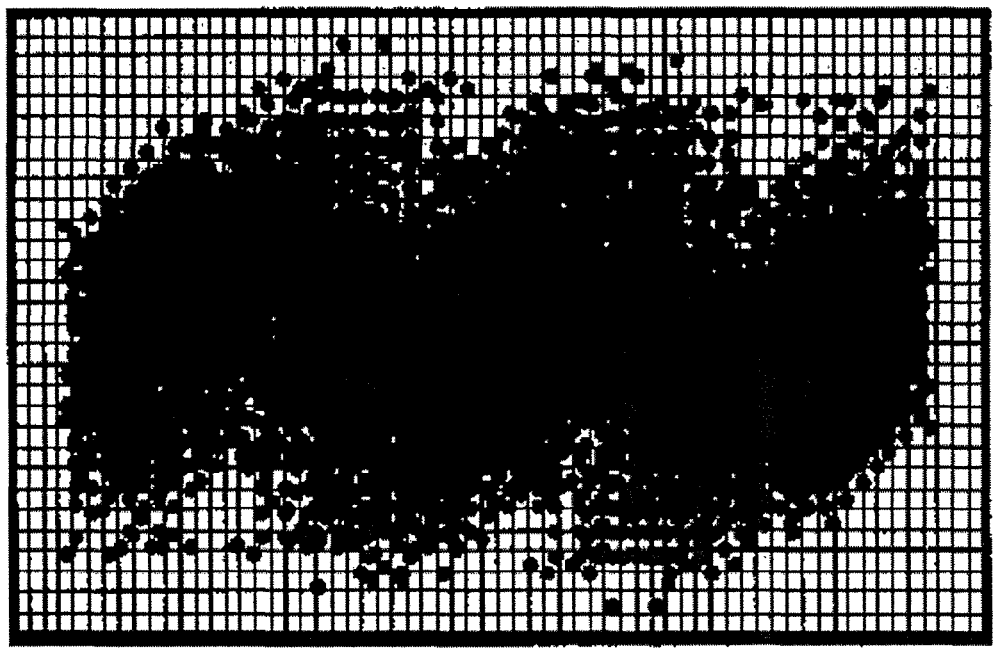
FIG. 32 is a view illustrating a situation in which segment lines are added to the invariant feature space.

The first invariant feature converting unit 51 having mapped the feature points onto the invariant feature space divides the invariant feature space into a plurality of the segments by using grid-shape mesh cells as shown in FIG. 32.

Figure 33:
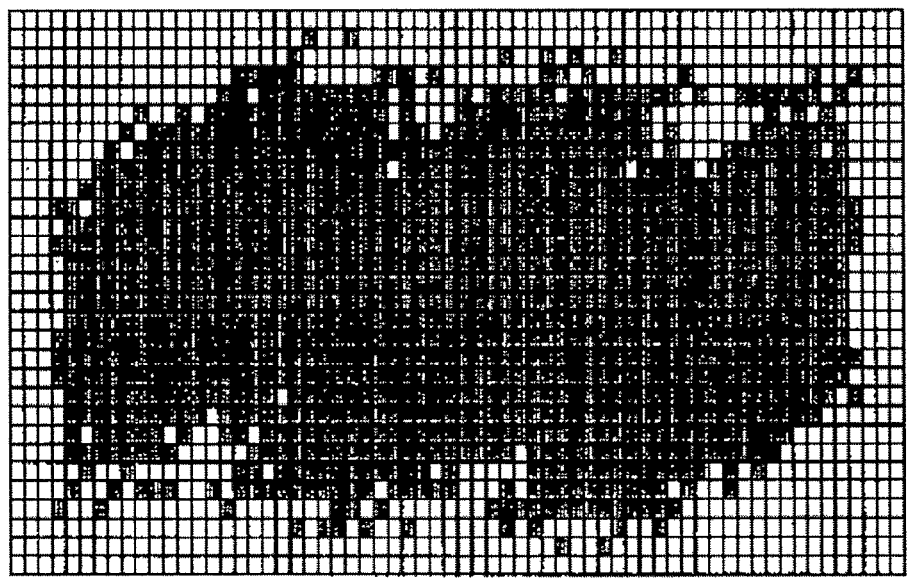
FIG. 33 is a view illustrating the invariant feature space in which the segments having one feature point or more arranged therein are hatched in a gray color.

Continuously, the first invariant feature converting unit 51 obtains the number of the invariant features for each segment. A result of this calculation is shown in FIG. 33. FIG. 33 is a view in which the segments of the invariant feature space in which the number of the invariant features is one or more have been colorized in a gray color.

The second invariant feature converting unit 52 maps the feature points of the mark onto the invariant feature space.

This method of the map is identical to the method of mapping the feature points of the background video image onto the invariant feature space that is performed by the first invariant feature converting unit 51.

Figure 34:
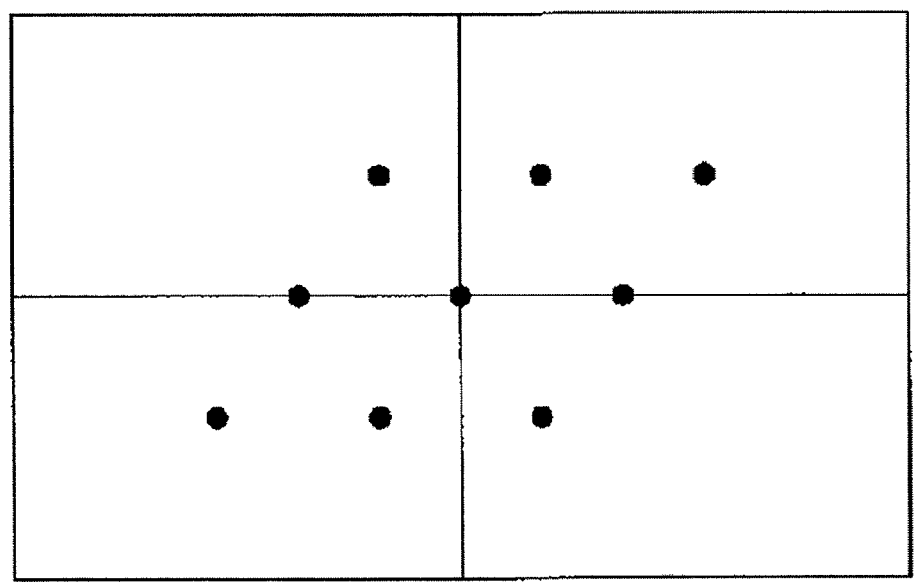
FIG. 34 is a view illustrating a situation in which the feature points of the mark are mapped onto the invariant feature space.

For example, when the feature points shown in FIG. 20 are mapped onto the invariant feature space, the invariant features are arranged as shown in FIG. 34.

Further, for the invariant features in the invariant feature space, the second invariant feature converting unit 52 prepares "the mark feature information table" (see FIG. 4). This prepared "mark feature information table" is stored in the mark feature storing unit 12 of the feature comparing means 20.

The invariant feature storing unit 53 holds a predetermined memory region. This invariant feature storing unit 53 stores various kinds of data obtained by the first invariant feature converting unit 51. The various kinds of data contains, for example, the coordinates of respective invariant features arranged in the invariant feature space, the coordinates (scopes) of respective segments, respective by-segment invariant feature numbers, and the like.

Figure 35:
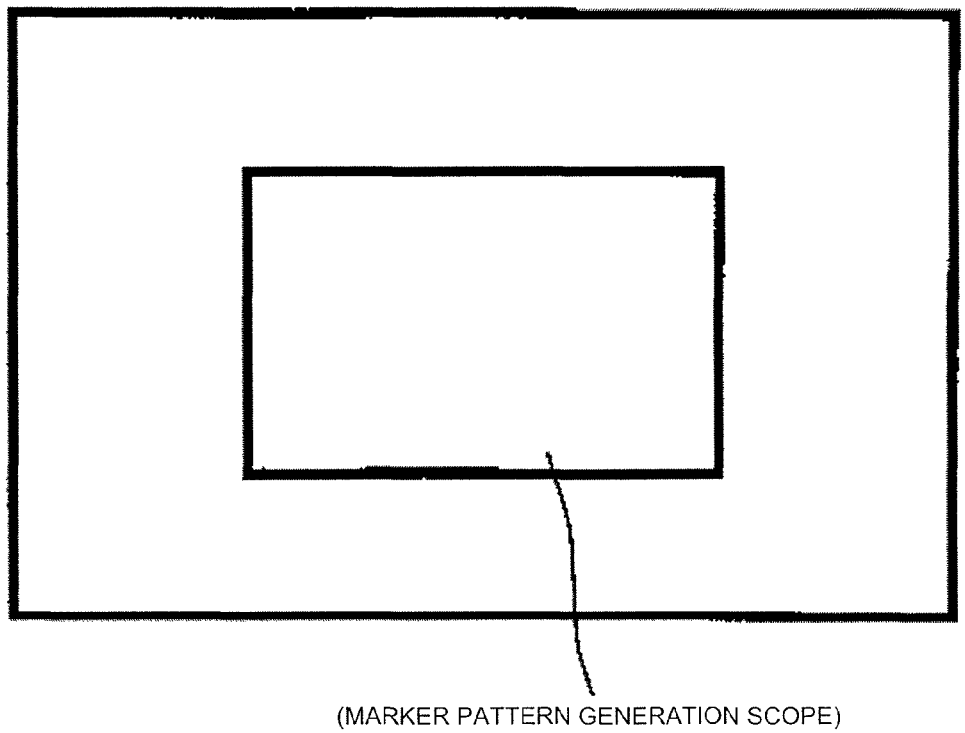
FIG. 35 is a view illustrating a marker pattern generation scope in the invariant feature space.

The unique feature selecting unit 54, as show in FIG. 35, decides the scope (scope for determining whether or not the mark, being a determination target, can be used as the detection marker) for generating the marker pattern in the invariant feature space as a marker pattern generation scope. Size of this marker pattern generation scope could be identical to that of the still image frame.

Next, the unique feature selecting unit 54 takes out the by-segment invariant feature numbers in the above marker pattern generation scope from the invariant feature storing unit 53. These taken-out by-segment invariant feature numbers are shown in FIG. 36.

Figure 36:
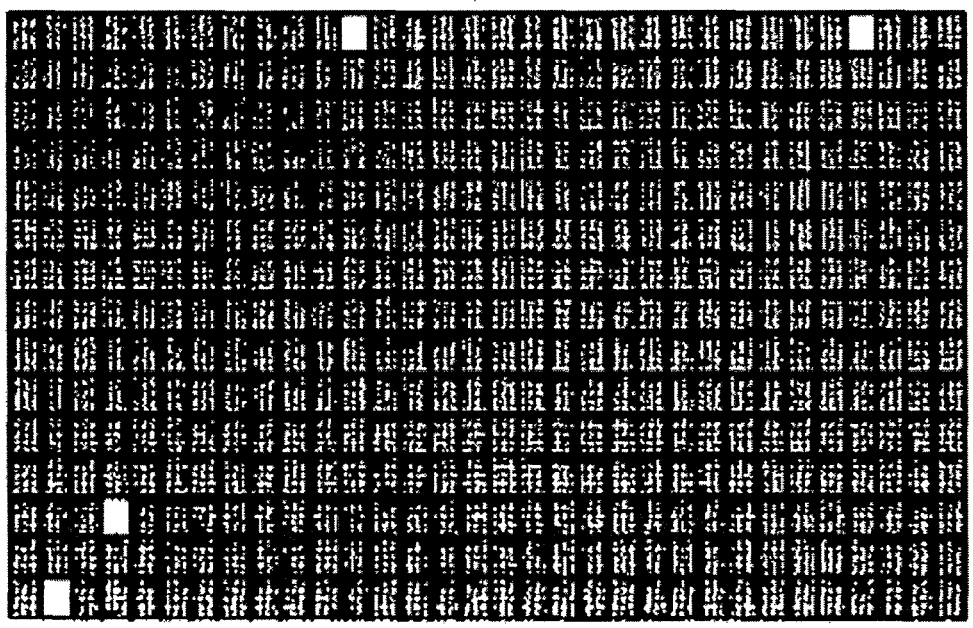
FIG. 36 is a view illustrating the marker pattern generation scope in which the segments having one feature point or more arranged therein are hatched in a gray color.

Additionally, FIG. 36 is a view in which the segments of the marker pattern generation scope in which the number of the invariant features is one or more have been colorized in a gray color.

Continuously, the unique feature selecting unit 54 selects the segments having an invariant feature number of zero, or equal to or less than a predetermined value, out of the by-segment invariant feature numbers, in the marker pattern generation scope as the unique features.

And, the unique feature selecting unit 54 prepares "the unique feature information table" about the selected unique features (see FIG. 3), and causes the unique feature storing unit 11 to store it.

(II) Marker Determination Method

Figure 37:
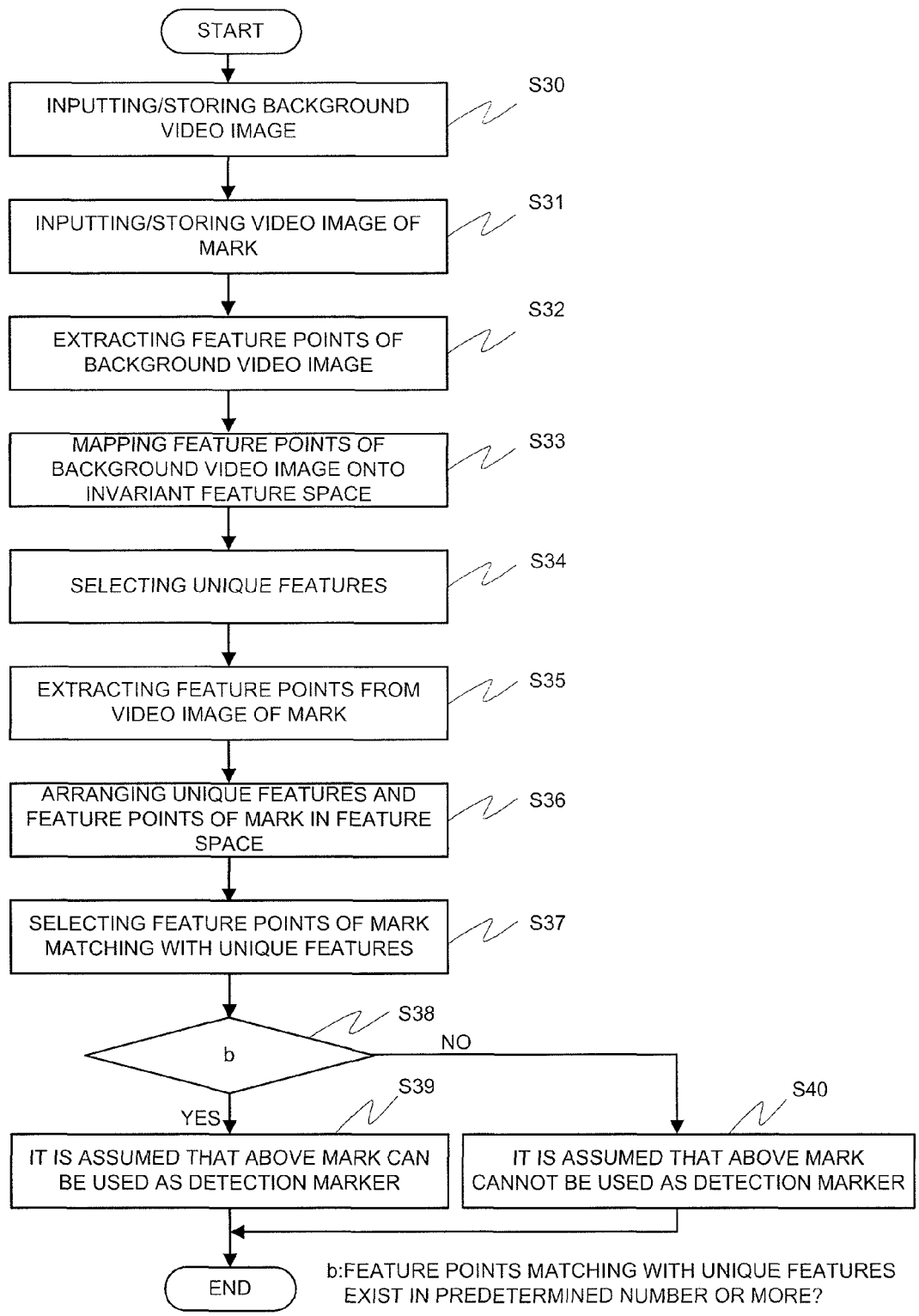
FIG. 37 is a flowchart illustrating an operation of the marker determination device in the third exemplary embodiment of the present invention.

Next, an operation of the marker determination device (marker determination method) will be explained by making a reference to FIG. 37.

The same figure is a flowchart illustrating a processing procedure of the marker determination method of this exemplary embodiment.

In the marker determination device 1c, the video image inputting unit 31 of the video image inputting means 30 images (or inputs) the background video image (Step 30). This background video image may be configured of plural pieces of the frame images. The video image storing unit 32 of the video image inputting means 30 stores as the frame image the background video image inputted by the video image inputting unit 31.

Further, the video image inputting unit 31 images (or inputs) the video image of the mark, being a determination target (Step 31). The video image storing unit 32 stores the video image of the mark inputted by the video image inputting unit 31.

The background feature extracting unit 41 of the feature extracting means 40 takes out the frame image from the video image storing unit 32, and extracts the feature points from this frame image (Step 32).

Further, the background feature extracting unit 41 arranges these feature points in the feature space. And, the background feature extracting unit 41 calculates the coordinates of the feature points in the feature space. These calculated coordinates are put together as "the feature point information table", and are stored in the feature storing unit 43.

Next, the first invariant feature converting unit 51 of the invariant feature converting means 50 maps the feature points of the background video image onto the invariant feature space (Step 33).

Continuously, the first invariant feature converting unit 51 divides the invariant feature space into a plurality of segments by using grid-shape mesh cells. In addition, the first invariant feature converting unit 51 obtains the number of the invariant features for each segment, and selects the segments in which the invariant feature number is zero, or equal to or less than a predetermined number as the unique features (Step 34).

And, the first invariant feature converting unit 51 prepares "the unique feature information table" indicative of the coordinates of the selected unique features. The unique feature storing unit 11 of the feature storing means 10 stores "the unique feature information table".

The mark feature extracting unit 42 of the feature extracting means 40 takes out the image of the mark from the video image storing unit 32, and extracts the feature points from this image of the mark (Step 35).

Further, the mark feature extracting unit 42 arranges these feature points in the feature space. And, mark feature extracting unit 42 calculates the coordinates of the feature points in the feature space. These calculated coordinates are put together as "the mark feature information table", and stored in the mark feature storing unit 12 of the feature storing means 10.

The feature comparing unit 21 of the feature comparing means 20 takes out "the unique feature information table" from the unique feature storing unit 11. Further, the feature comparing unit 21 takes out "the mark feature information table" from the mark feature storing unit 12.

Next, the feature comparing unit 21 makes a reference to "the unique feature information table" and arranges the unique features in the feature space. Further, the feature comparing unit 21 makes a reference to "the mark feature information table" and arranges the feature points of the mark in the above feature space (Step 36). And, the feature comparing unit 21 selects the feature points of the mark matching with the unique features (Step 37).

Continuously, the feature comparing unit 21 determines whether or not the number of the feature points of the selected mark is equal to or more than a predetermined number (Step 38).

When the number of the feature points of the selected mark is equal to or more than a predetermined number as a result of determination, it is assumed that the above mark can be used as the detection marker (Step 39).

On the other hand, when the number of the feature points of the selected mark is less than a predetermined number, it is assumed that the above mark cannot be used as the detection marker (Step 40).

As explained above, the marker determination device and the marker determination method of the present invention were configured to extract the feature points from the mark, being a determination target, to arrange these feature points in the invariant feature space, and to determine whether these feature points match with the unique features. This makes it possible to determine whether or not the existing mark and the mark of which the design has been decided could become a detection target of the marker detection device.

Additionally, while the invariant features based upon the mark alone are arranged in the invariant feature space shown in FIG. 34, the invariant feature is not limited to the invariant feature based upon the mark alone, and for example, it is also possible to extract the feature points from the background containing the mark, to map these feature points onto the invariant feature space, and to compare these feature points with the unique features. Also in this case, when the segments containing the invariant features of the mark match with the unique features, it may be determined that the above mark can be used as the detection marker.

[The Marker Detection Device and the Marker Detection Method]

(The Marker Detection Device)

Next, the marker detection device will be explained by making a reference to FIG. 38 and FIG. 39.

Figure 38:
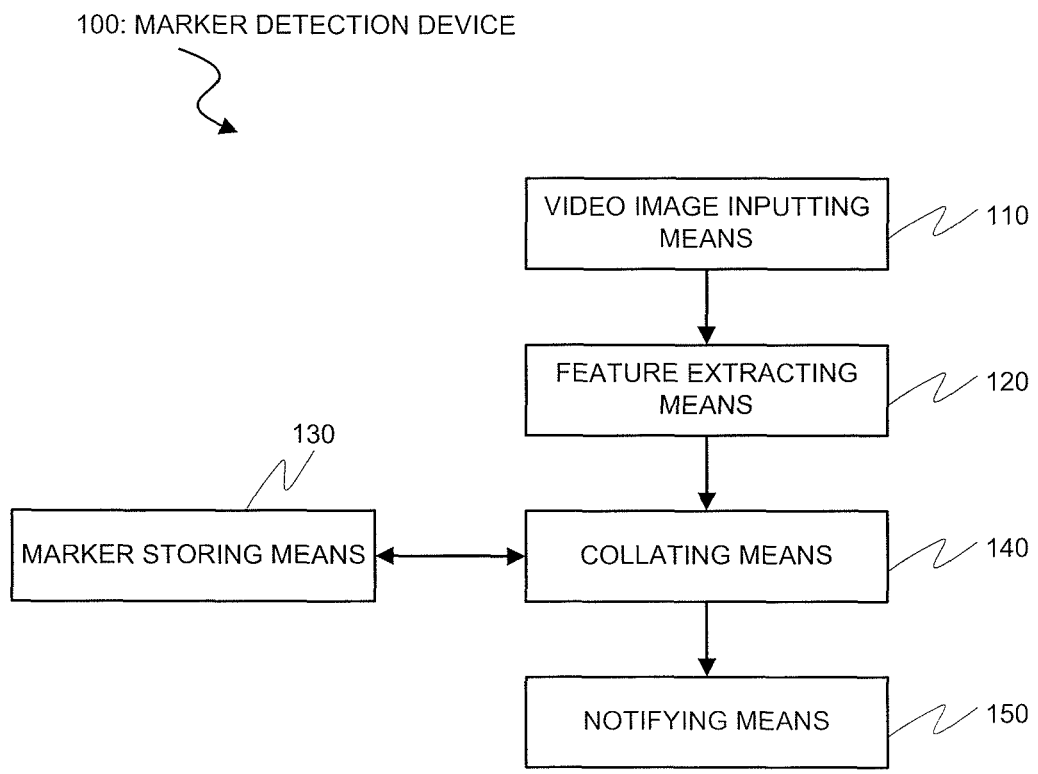
FIG. 38 is a block diagram illustrating a configuration of the marker detection device.

FIG. 38 is a block diagram illustrating a configuration of the marker detection device. FIG. 39 is a block diagram illustrating a detailed configuration of the marker detection device.

As shown in FIG. 38, a marker detection device 100 is provided with a video image inputting means 110, a feature extracting means 120, a marker storing means 130, a collating means 140, and a notifying means 150.

Figure 39:
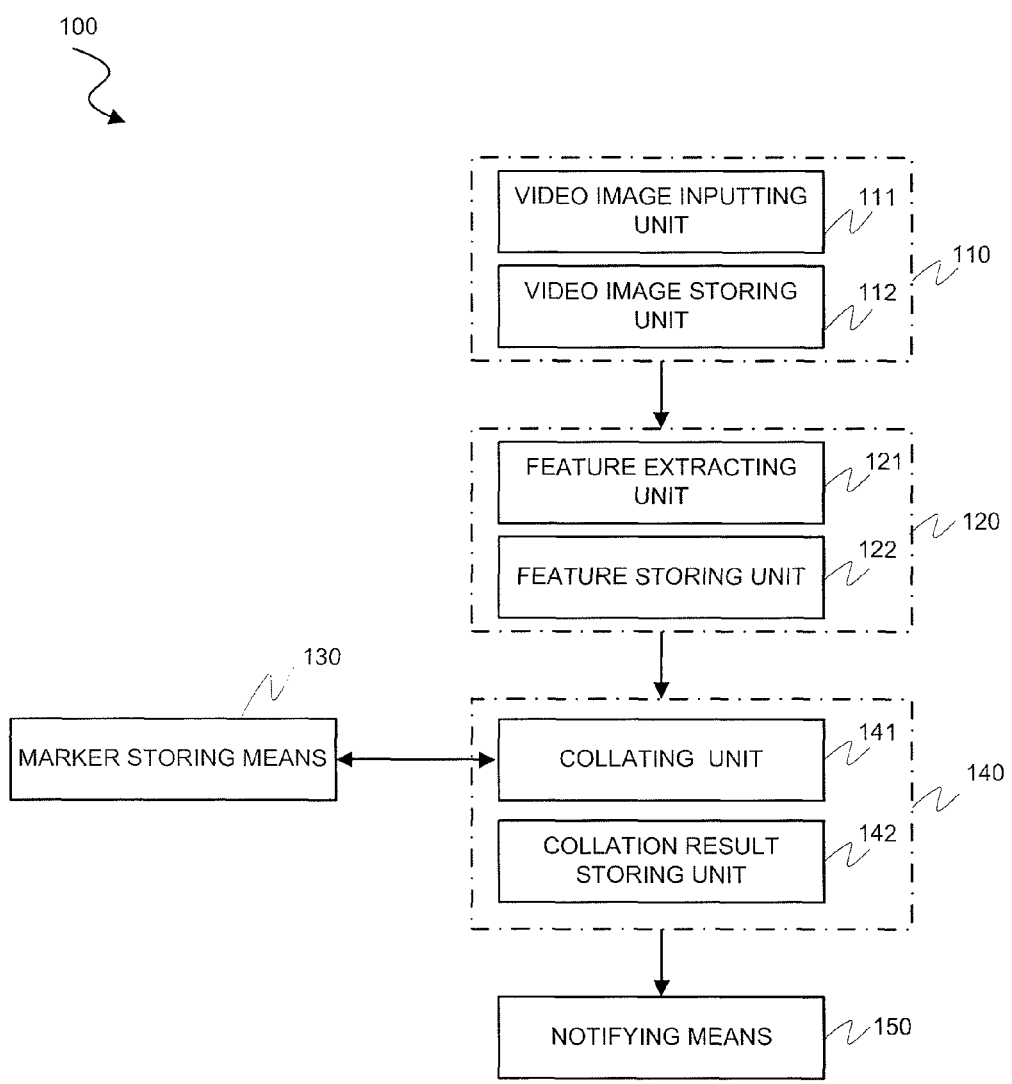
FIG. 39 is a block diagram illustrating a detailed configuration of the marker detection device.

Herein, the video image inputting means 110 includes a video image inputting unit 111 and a video image storing unit 112 as shown in FIG. 39.

Figure 40:
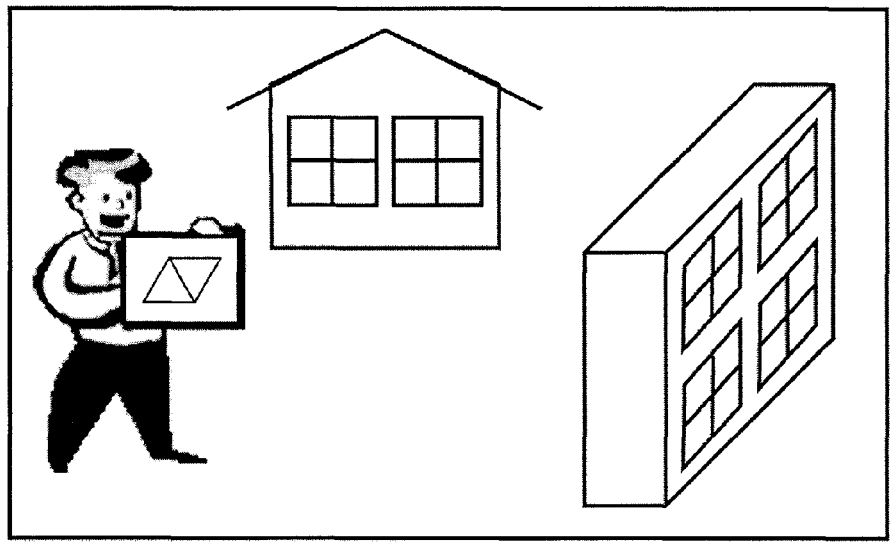
FIG. 40 is a view illustrating an example of the detection-targeted video image.

The video image inputting unit 111 images (inputs) the environment in which the marker might exist as the detection-targeted video image. For example, the video image inputting unit 111 may input the detection-targeted video image containing the marker as shown in FIG. 40.

The video image storing unit 112 stores the still image frames constituting the detection-targeted video image as digitalized frame images.

The feature extracting means 120 includes a feature extracting unit 121 and a feature storing unit 122 as shown in FIG. 39.

The feature extracting unit 121 takes out the frame images from the video image storing unit 112. And, the feature extracting unit 121 extracts the image features containing characteristic patterns in the taken-out frame images.

Figure 41:
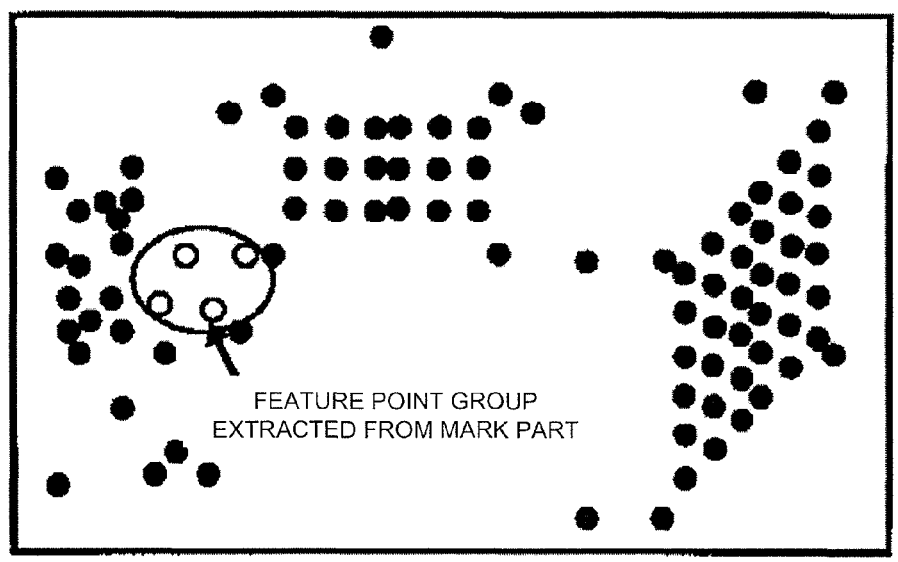
FIG. 41 is a view illustrating an example of the feature points extracted from the detection-targeted video image.

For example, when the detection-targeted video image is an image shown in FIG. 40, the feature extracting unit 121 extracts the feature points shown in FIG. 41 from the above detection-targeted video image.

The feature storing unit 122 stores each of the coordinates of the feature points extracted by the feature extracting unit 121.

The marker storing means 130 stores data related to the marker patterns determined by the marker determination device 1. This marker storing means 130 may store, for example, the feature points based upon the marker patterns.

The collating means 140, as shown in FIG. 39, includes a collating unit 141 and a collation result storing unit 142.

The collating unit 141 takes outs each of the coordinates of the feature points based upon the detection-targeted video images from the feature storing unit 122, takes out each of the coordinates of the feature points based upon the marker pattern from the marker storing unit 130, and collates them. And, the collating unit 141 determines whether or not a feature point matching with the feature point based upon the marker pattern exists within the feature points based upon the detection-targeted video image.

For example, a configuration may be made so that when one feature of the marker pattern and one feature generated from the detection-targeted video image have an Euclidean distance equal to or less than a predetermined value in the feature space, these features may be regarded as a match, and the number of the features regarded as a match is accumulated as a score, and when the score reaches a threshold, the detection of the markers is acknowledged. Further, a condition that the accumulated value of the aforementioned Euclidean distances is equal to or less than a predetermined value may be added hereto.

Further, for example, when the feature extracting unit 21 of the marker determination device 1a performs the determination of the unique features in a quantized feature space, the marker storing means 130 stores the coordinates of the above unique features beforehand. And, when the feature coming from the detection-targeted video image has been projected even once onto the mesh cell having a frequency of zero at the time of designing the marker, the collating unit 141 may regard it as contribution from the marker pattern to confirm the detection. With this, the marker detection can be quickly performed.

So as to avoid the erroneous detection of the marker due to noise or an error in the feature extraction calculation, the frequency of the projection to be acknowledged may be defined as a predetermined value of one or more. Alternatively, when the quantized feature space can be generated from the marker pattern, it may be utilized. In this case, the marker pattern detection may be acknowledged when the unique feature obtained from the detection-targeted video image matches with a feature space mesh onto which the marker pattern is projected once or a predetermined number of times.

When as a result of this collation, a feature point matching with the feature point based upon the marker pattern exists within the feature points based upon the detection-targeted video image, the collating unit 141 detects the coordinate of the above feature point in the detection-targeted video image, and causes the collation result storing unit 142 to store it. Further, the collating unit 141 sends out a notification signal to the notifying means 150.

On the other hand, when no feature point matching with the feature point based upon the marker pattern exists within the feature points based upon the detection-targeted video image, the collating unit 141 does not detect the coordinates of the feature points, nor sends out the notification signal.

Specifically, the collating unit 141 searches the feature point group shown in FIG. 41 for feature points matching with the feature points based upon the marker pattern taken out from the marker storing means 130. At this time, the collating unit 141 expands or reduces the feature point group based upon the marker pattern, and collates it with the feature point group in the feature space.

As a result, when the collating unit 141 finds the feature points matching with the feature points based upon the marker pattern extracted from the marker storing means 130, from among the feature point group shown in FIG. 41, it detects the coordinated of the above feature point in the feature space shown in FIG. 41, and causes the collation result storing unit 142 to store it.

The collation result storing unit 142 stores data related to the collation performed in the collating unit 141.

For example, the collation result storing unit 142 stores each of the coordinates of the feature points (in FIG. 41, feature points encircled by a left-side ellipse) matching with the feature points based upon the marker pattern, out of the feature points based upon the detection-targeted video image.

Upon receipt of the notification signal from the collating unit 141, the notifying means 150 notifies the outside that a feature point matching with the feature point based upon the marker pattern exists within the feature points based upon the detection-targeted video image. As a method of this notification, for example, there exists a voice output, a screen display, or the like.

(The Marker Detection Method)

Figure 42:
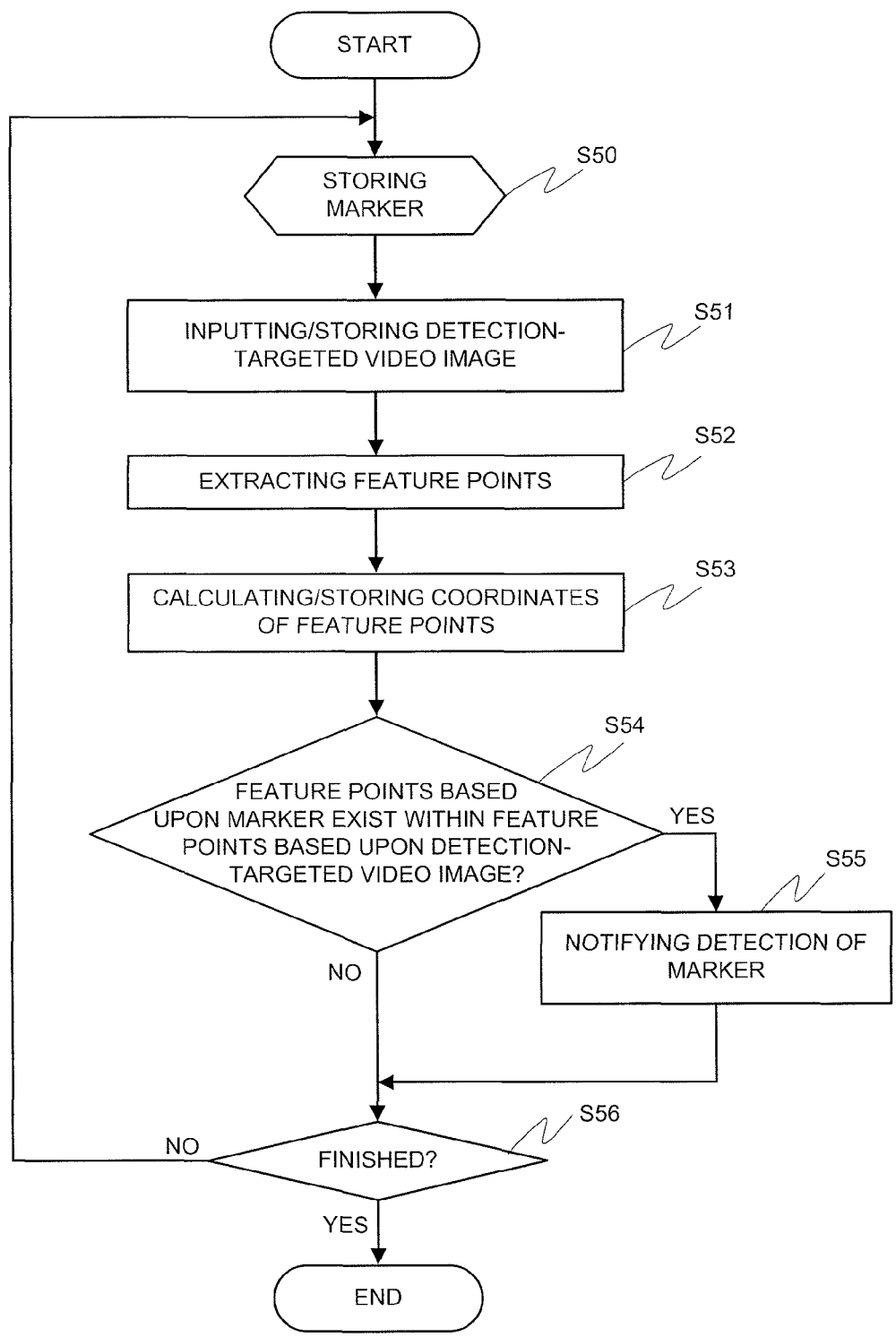
FIG. 42 is a flowchart illustrating a procedure of the marker detection method.

Next, the marker detection method of this exemplary embodiment will be explained by making a reference to FIG. 42.

The marker storing means 130 stores data related to the marker determined to be the determination target by the marker determination device 1 beforehand (Step 50). This marker storing means 130 may store, for example, the feature points based upon the marker pattern.

The video image inputting unit 111 of the video image inputting means 110 inputs the environment in which the marker might exist as the detection-targeted video image (Step 51).

The video image storing unit 112 stores the still image frames constituting the detection-targeted video image as digitalized frame images.

The feature extracting unit 121 of the feature extracting means 120 takes out the frame image from the video image storing unit 112. And, the feature extracting unit 121 extracts the image features containing characteristic patterns in the taken-out frame image (Step 52).

Further, the feature extracting unit 121 calculates the coordinates of the extracted feature points (Step 53).

The feature storing unit 122 stores each of the coordinates of the feature points calculated by the feature extracting unit 121.

The collating unit 141 of the collating means 140 takes outs each of the coordinates of the feature points based upon the detection-targeted video images from the feature storing unit 122, takes out each of the coordinates of the feature points based upon the marker pattern, and collates them (Step 54). And, the collating unit 141 determines whether or not a feature point matching with the feature point based upon the marker pattern exists within the feature points based upon the detection-targeted video image.

When as a result of the determination, a feature point matching with the feature point based upon the marker pattern exists within the feature points based upon the detection-targeted video image, the collating unit 141 detects the coordinate of the above feature point in the detection-targeted video image, and causes the collation result storing unit 142 to store it. Further, the collating unit 141 sends out the notification signal to the notifying means 150.

On the other hand, when no feature point matching with the feature point based upon the marker pattern exists within the feature points based upon the detection-targeted video image, the collating unit 141 does not detect the coordinates of the feature points, nor send outs the notification signal.

Upon receipt of the notification signal from the collating unit 141, the notifying means 150 notifies the outside that a feature point matching with the feature point based upon the marker pattern exists within the feature points based upon the detection-targeted video image (Step 55).

Thereafter, a determination as to whether or not to finish the operation is made (Step 56), and processes of the Step 51 to the Step 56 are repeated when the operation is not finished.

As explained above, the marker detection device and the marker detection method of this exemplary embodiment enable the marker reflected onto the detection-targeted video image to be surely detected by employing the mark determined to be usable as the detection marker by the marker determination device.

Further, while it was assumed that the detection of the marker was implemented in the feature space in this exemplary embodiment, the detection of the marker is not limited to the implementation in the feature space, and for example, the detection of the marker may be implemented in the invariant feature space. In this case, in the marker determination stage, the unique feature arrangement diagram from which the unique features have been selected is stored beforehand, and in the marker detection stage, the feature points are extracted from the detection-targeted video image, these feature points are mapped onto the invariant feature space and are defined as the invariant features, this invariant feature space and the aforementioned unique feature arrangement diagram are superposed, and when the invariant feature indicated in the invariant feature space appears in the unique features indicated in the unique feature arrangement diagram, this invariant feature may be detected as the invariant feature based upon the marker.

In addition, when the object-color invariant and the texture invariant are employed at the time of determining the detection marker, the marker is detected by employing these object-color invariant and texture invariant at the time of detecting the marker. In this case, in the marker determination stage, the object-color invariant and the texture invariant are extracted from the background video image, and the unique features based upon these are selected and stored beforehand, and in the marker detection stage, when the object-color invariant and the texture invariant are extracted from the detection-targeted video image, and these object-color invariant and texture invariant match with the unique feature, these object-color invariant and texture invariant may be detected as the marker.

[The Marker Determination Detection Device and the Marker Determination Detection System]

(The Marker Determination Detection Device)

Next, the marker determination detection device will be explained by making a reference to FIG. 43.

Figure 43:
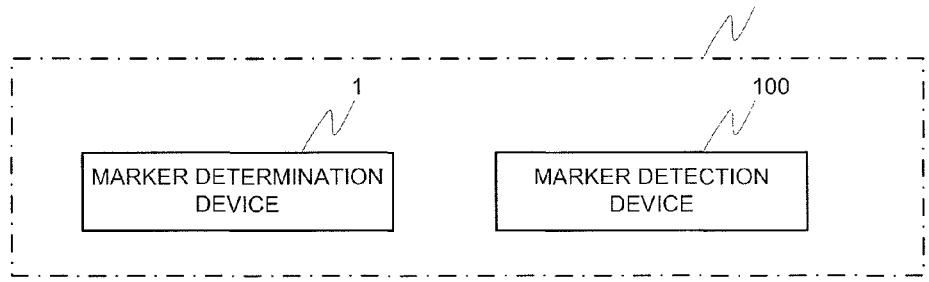
FIG. 43 is a block diagram illustrating a configuration of the marker determination detection device.

FIG. 43 is a block diagram illustrating a configuration of the marker determination detection device.

As shown in FIG. 43, a marker determination detection device 1000 is provided with a marker determination device 1 and a marker detection device 100.

Herein, as the marker determination device 1, any of the marker determination devices 1 of the first exemplary embodiment to the third exemplary embodiment described before may be employed.

As the marker detection device 100, the marker detection device 100 shown in FIG. 43 described before may be employed.

In such a manner, the marker determination detection device 1000 may assume a configuration in which the marker determination device 1 and the marker detection device 100 are unified.

Figure 44:
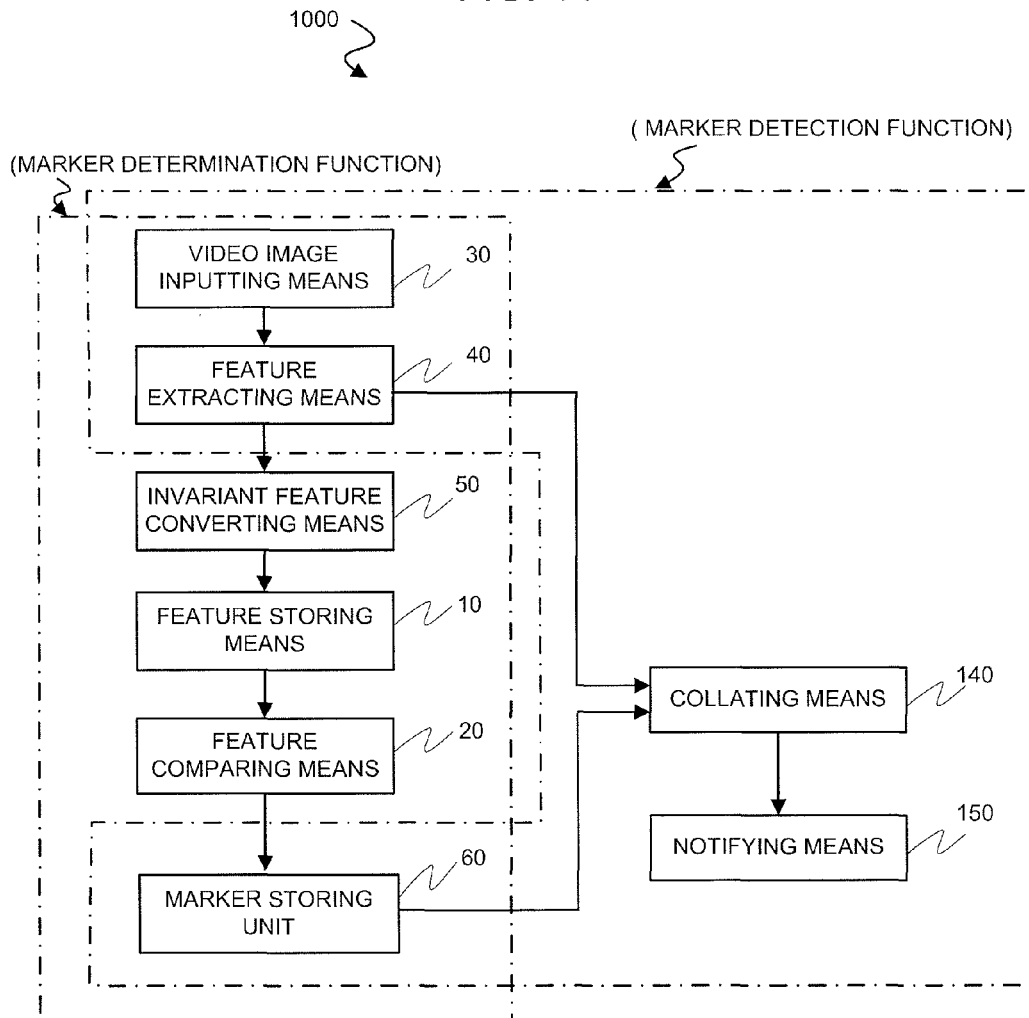
FIG. 44 is a block diagram illustrating a detailed configuration of the marker determination detection device.

Further, the marker determination detection device 1000 may assume a configuration as shown in FIG. 44 because the marker determination device 1 and the marker detection device 100 include a function that can be shared.

For example, the marker determination detection device 1000 includes a video image inputting means 30, a feature extracting means 40, an invariant feature converting means 50, a feature storing means 10, a feature comparing means 20, a marker storing unit 60, a collating means 140, and a notifying means 150.

The video image inputting means 30, the feature extracting means 40, the invariant feature converting means 50, the feature storing means 10, the feature comparing means 20, and the marker storing unit 60, out of them, include a function as the marker determination device, respectively.

On the other hand, the video image inputting means 30, the feature extracting means 40, the marker storing unit 60, the collating means 140, and the notifying means 150 include a function as the marker detection device, respectively.

And, the video image inputting means 30, the feature extracting means 40, and the marker storing unit 60 are portions that are common in the marker determination device and the marker detection device.

The marker determination method in the marker determination device is similar to the marker determination method in the first exemplary embodiment to the third exemplary embodiment described before.

Further, the marker detection method in the marker detection device is similar to the marker detection method in the exemplary embodiments described before.

(The Marker Determination Detection System)

Next, the marker determination detection system of this exemplary embodiment will be explained by making a reference to FIG. 45.

As shown in the same figure, a marker determination detection system 2000 is provided with a marker determination device 1 and a marker detection device 100. These marker determination device 1 and marker detection device 100 may be connected to each other via a communication network, a communication cable 300, or the like.

The marker determination device 1 includes a video image inputting means 30, a feature extracting means 40, an invariant feature conversion means 50, a feature storing means 10, a feature comparing means 20, a marker storing unit 60, and a communicating means 70.

The communicating means 70 takes out data related to the markers stored in the marker storing unit 60, and transmit it to the marker detection device 100.

The marker detection device 100 includes a video image inputting means 110, a feature extracting means 120, a marker storing means 130, a collating means 140, a notifying means 150, and a communicating means 160.

The communicating means 160 receives the data related to the markers transmitted from the marker determination device 1. Further, the communicating means 160 causes the marker storing means 130 to store the above received data related to the markers.

As explained above, the marker determination detection device and the marker determination detection system make it possible to determine whether or not the existing mark or the marks of which the design has been decided could be fit as the detection target of the marker detection device.

[The Marker Determination Program and the Marker Detection Program]

Next, the marker determination program and the marker detection program will be explained.

The marker determination function (function of executing the marker determination method) and the marker detection function (function of executing the marker detection method) of a computer (the marker determination device, the marker detection device, the marker determination detection device, and the marker determination detection system) in the above-mentioned each exemplary embodiment are realized with the marker determination program or the marker detection program stored in the storing means (for example, ROM (Read Only Memory), a hard disk, or the like).

The marker determination program and the marker detection program, which are loaded into a controlling means (CPU (Central Processing Unit) etc.) of the computer, send a command to each of the components of the computer, and cause the components of the computer to execute predetermined processes, for example, the video image input process, the feature extraction process, the unique feature selection process, the marker determination process, the invariant feature conversion process of the marker determination device as well as the video image input process, the feature extraction process, the collation process, and the notification process of the marker detection device, and the like.

With this, the configuring means of the marker determination program, being software, and the computer (the marker determination device, the marker detection device, the marker determination detection device, and the marker determination detection system), being the hardware resource, cooperate with each other, thereby allowing the marker determination function and the marker detection function to be realized.

Additionally, the marker determination program for realizing the marker determination function and the marker detection function is stored in ROM and a hard disk of the computer, and the like, and besides, it may be filed in computer-readable recording mediums, for example, an external storage device and a portable recording medium.

The so-called external storage device could be a memory expansion device that has the recording medium such as CD-ROM (Compact Disc-Read Only Memory) built-in therein and is externally connected to the marker determination device. On the other hand, the so-called portable recording medium is a recording medium that is installable into a recording medium driving device (driving device) and yet is portable, and for example, could be a flexible disc, a memory card, an optical magnetic disc, and the like.

And, the program recorded in the recording medium is loaded into RAM (Random Access Memory) of the computer or the like, and is executed by CPU (controlling means). This execution allows the function of the marker determination device of each exemplary embodiment described above to be realized.

In addition, when the marker determination program is loaded by the computer, the marker determination program kept by other computers may be downloaded into RAM or an external storage device, which the above computer includes, by utilizing a communication line. This downloaded marker determination program is also executed by CPU, and the marker determination function of the marker determination device of each of the above-mentioned exemplary embodiments is realized.

As explained above, the marker determination device, the marker determination detection system, the marker determination detection device, the marker, the marker determination method, and the marker determination program of this exemplary embodiment makes it possible to determine whether or not the existing mark and the mark of which the design has been decided beforehand can be used as a detection target of the marker detection device.

While the preferred exemplary embodiments of the marker determination device, the marker determination detection system, the marker determination detection device, the marker, the marker determination method, and the marker determination program of the present invention were explained above, the marker determination device, the marker determination detection system, the marker determination detection device, the marker, the marker determination method, and the marker determination program in accordance with the present invention are not limited only to the exemplary embodiments described above, and it will be understood that various changes in form and details may be made herein without departing from the spirit and scope of the present invention as defined by the claims. For example, while in the exemplary embodiments described above, the method of making a determination with one mark taken as a determination-target mark was explained, the number of the determination-target marks is not limited to one (1), and a plurality of the marks may be determined at a time.

Further, the marker determination device may be provided with a notifying means. The notifying means, upon receipt of the notification signal from the feature comparing unit, notifies a result of a determination as to whether or not the determination-target mark can be used as the detection marker to the outside. As a method of this notification, for example, there exists a voice output, a screen display, or the like.

In addition, when, in a case in which the background video image is changed temporally, the feature point of the mark and the unique feature are not superposed temporally in the feature space or the invariant feature space, the feature comparing unit may determine that the above mark can be used as the detection marker.

Further, the content of the above-mentioned exemplary embodiments can be expressed as follows.

(Supplementary note 1) A marker determination device in which feature points extracted from an image are arranged in a predetermined space, and portions of this predetermine space in which the number of said feature points is equal to or less than a predetermined number are defined as unique features, comprising:
  a feature storing means that stores these unique features, and the feature points extracted from an existing mark; and
  a feature comparing means that arranges the feature points extracted from said existing mark in said predetermined space, and determines that said existing mark can be used as a marker that is detectable from said image when the number of the feature points matching with said unique features is equal to or more than a predetermined number.

(Supplementary note 2) A marker determination device according to Supplementary note 1, comprising:
  a video image inputting means that images said image;
  a feature extracting means that extracts the feature points from said image; and
  a unique feature selecting means that arranges said feature points in a feature space, selects as said unique features portions of this feature space in which the number of said feature points is equal to or less than a predetermined number, wherein said feature comparing means arranges the feature points extracted from said existing mark in said predetermined space, and determines that said existing mark can be used as a marker that is detectable from said image when the number of the feature points matching with said unique features is equal to or more than a predetermined number.

(Supplementary note 3) A marker determination device according to Supplementary note 1, comprising:
  a video image inputting means that images said image;
  a feature extracting means that extracts the feature points from said image; and
  an invariant feature converting means that maps the feature points extracted from said image onto an invariant feature space, and selects as said unique features portions of this invariant feature space in which the number of said feature points is equal to or less than a predetermined number, wherein said feature comparing means arranges the feature points extracted from said existing mark in said invariant feature space, and determines that said existing mark can be used as a marker that is detectable from said image when the number of the feature points matching with said unique features is equal to or more than a predetermined number.

(Supplementary note 4) A marker determination device according to one of Supplementary note 1 to Supplementary note 3, comprising a notifying means that notifies a result of a determination by said feature comparing means to the outside.

(Supplementary note 5) A marker determination detection system comprising a marker determination device and a marker detection device:
  wherein said marker determination device comprises:
    a first video image inputting means that inputs an image;
    a first arranging means that extracts feature points from said image inputted by this first video image inputting means and displays these extracted feature points onto a predetermined space;
    a unique feature selecting means that selects as unique features portions of said space in which the number of said feature points is equal to or less than a predetermined number;
    a feature comparing means that arranges the feature points based upon an existing mark in said predetermined space, selects the feature points matching with said unique features, and determines that said mark can be used as a marker that is detectable from said image when the number of these selected feature points is equal to or more than a predetermined number;
    a marker storing means that stores the feature points of said mark; and
  wherein said marker detection device comprises:
    a second video image inputting means that inputs the image;
    a second arranging means that extracts the feature points based upon said image inputted by this second video image inputting means, and displays these extracted feature points onto the predetermined space; and
    a collating means that determines whether or not an arrangement of the feature point based upon said marker exists in an arrangement of a feature point group displayed onto said predetermined space.

(Supplementary note 6) A marker determination detection system according to Supplementary note 5:
  wherein said first arranging means arranges said extracted feature points in a feature space; and
  wherein said unique feature selecting means selects as the unique features portions of said feature space in which the number of said feature points is equal to or less than a predetermined number.

(Supplementary note 7) A marker determination detection system according to Supplementary note 5:
  wherein said first arranging means maps said extracted feature points onto an invariant feature space; and
  wherein said unique feature selecting means selects as the unique features portions of said invariant feature space in which the number of said feature points is equal to or less than a predetermined number.

(Supplementary note 8) A marker determination detection device, comprising:
  a first video image inputting means that inputs an image;
  a first arranging means that extracts feature points from said image inputted by this first video image inputting means, and displays these extracted feature points onto a predetermined space;
  a unique feature selecting means that selects as unique features portions of said space in which the number of said feature points is equal to or less than a predetermined number;
  a feature comparing means that arranges the feature points based upon an existing mark in said predetermined space, selects the feature points matching with said unique features, and determines that said existing mark can be used as a marker that is detectable from said image when the number of these selected feature points is equal to or more than a predetermined number;

a marker storing means that stores said marker;

a second video image inputting means that inputs the image;

a second arranging means that extracts the feature points based upon said image inputted by this second video image inputting means, and displays these extracted feature points onto the predetermined space; and a collating means that determines whether or not an arrangement of the feature point corresponding to said marker exists within an arrangement of a feature point group displayed onto said predetermined space.

(Supplementary note 9) A marker determination detection device according to Supplementary note 8: wherein said first arranging means arranges said extracted feature points in a feature space; and wherein said unique feature selecting means selects as the unique features portions of said feature space in which the number of said feature points is equal to or less than a predetermined number.

(Supplementary note 10) A marker determination detection device according to Supplementary note 8: wherein said first arranging means maps said extracted feature points onto an invariant feature space; and wherein said unique feature selecting means selects as the unique features portions of said invariant feature space in which the number of said feature points is equal to or less than a predetermined number.

(Supplementary note 11) A marker, wherein said marker is determined to be usable as a marker that is detectable from an image when feature points are extracted from said image, these extracted feature points are displayed in a predetermined space, portions of said predetermine space in which the number of said feature points is equal to or less than a predetermined number are selected as unique features, the feature points are extracted from an existing mark, these feature points are arranged in said predetermined space, the feature points matching with said unique features are selected, and the number of these selected feature points is equal to or more than a predetermined number.

(Supplementary note 12) A marker according to Supplementary note 11, wherein said extracted feature points are arranged in a feature space, and portions of this feature space in which the number of said feature points is equal to or less than a predetermined number are selected as unique features.

(Supplementary note 13) A marker according to Supplementary note 11, wherein said extracted feature points are mapped onto an invariant feature space, and portions of said invariant feature space in which the number of said feature points is equal to or less than a predetermined number are selected as unique features.

(Supplementary note 14) A marker determination method comprising the steps of:

inputting an image;

extracting feature points from said image, and displaying these extracted feature points onto a predetermined space;

selecting as unique features portions of said space in which the number of said feature points is equal to or less than a predetermined number; and arranging the feature points based upon an existing mark in said predetermined space, selecting the feature points matching with said unique features, and determining that said existing mark can be used as a marker that is detectable from said image when the number of these selected feature points is equal to or more than a predetermined number.

(Supplementary note 15) A marker determination method according to Supplementary note 14, comprising a step of arranging the feature points extracted from said existing mark in a feature space, and determining that said existing mark can be used as a marker that is detectable from said image when the number of the feature points matching with said unique features is equal to or more than a predetermined number.

(Supplementary note 16) A marker determination method according to Supplementary note 14, comprising a step of arranging the feature points extracted from said existing mark in an invariant feature space, and determining that said existing mark can be used as a marker that is detectable from said image when the number of the feature points matching with said unique features is equal to or more than a predetermined number.

(Supplementary note 17) A marker determination program for causing an information processing device to execute the processes of:

inputting an image;

extracting feature points from said image, and displaying these extracted feature points onto a predetermined space;

selecting as unique features portions of said space in which the number of said feature points is equal to or less than a predetermined number; and arranging the feature points based upon an existing mark in said predetermined space, selecting the feature points matching with said unique features, and determining that said existing mark can be used as a marker that is detectable from said image when the number of these selected feature points is equal to or more than a predetermined number.

(Supplementary note 18) A marker determination program according to Supplementary note 17, causing the information processing device to execute a process of arranging the feature points extracted from said existing mark in a feature space, and determining that said existing mark can be used as a marker that is detectable from said image when the number of the feature points matching said unique features is equal to or more than a predetermined number.

(Supplementary note 19) A marker determination program according to Supplementary note 17, causing the information processing device to execute a process of arranging the feature points extracted from said existing mark in an invariant feature space, and determining that said existing mark can be used as a marker that is detectable from said image when the number of the feature points matching said unique features is equal to or more than a predetermined number.

Additionally, as the marker determination device, the marker determination detection system, the marker determination detection device and marker determination method of the present invention, the marker determination devices and the marker determination methods in the first exemplary embodiment to the third exemplary embodiment may be arbitrarily combined.

This application is based upon and claims the benefit of priority from Japanese patent application No. 2009-171842, filed on Jul. 23, 2009, the disclosure of which is incorporated herein in its entirety by reference.

INDUSTRIAL APPLICABILITY

The present invention is an invention relating to generation of a marker, and may be applied to fields for devices or appliances for generating a marker. Besides, the present invention may also be applied for fields of video image monitoring such as those represented by article management and physical security, robot vision, mixed reality UI, and content generation.

REFERENCE SIGNS LIST 1 marker determination device
10 feature storing means
20 feature comparing means
30 video image inputting means
40 feature extracting means
50 invariant feature converting means
60 marker storing unit
100 marker detection device
110 video image inputting means
120 feature extracting means
130 storing means
140 collating means
1000 marker determination detection device
2000 marker determination detection system

The invention claimed is:

1. A marker determination device in which feature points extracted from an image are arranged in a predetermined space, and portions of this predetermine space in which the number of said feature points is equal to or less than a predetermined number are defined as unique features, comprising:
  a feature storage that stores these unique features, and the feature points extracted from an existing mark; and
  a feature comparator that arranges the feature points extracted from said existing mark in said predetermined space, and determines that said existing mark can be used as a marker that is detectable from said image when the number of the feature points matching with said unique features is equal to or more than a predetermined number.

2. A marker determination device according to claim 1, comprising:
  a video image inputting unit configured to image said image;
  a feature extracting unit configured to extract the feature points from said image; and
  a unique feature selector configured to arrange said feature points in a feature space, select as said unique features portions of this feature space in which the number of said feature points is equal to or less than a predetermined number, wherein said feature comparator arranges the feature points extracted from said existing mark in said predetermined space, and determines that said existing mark can be used as a marker that is detectable from said image when the number of the feature points matching with said unique features is equal to or more than a predetermined number.

3. A marker determination device according to claim 1, comprising:
  a video image inputting unit configured to image said image;
  a feature extracting unit configured to extract the feature points from said image; and
  an invariant feature convertor configured to map the feature points extracted from said image onto an invariant feature space, and select as said unique features portions of this invariant feature space in which the number of said feature points is equal to or less than a predetermined number, wherein said feature comparator arranges the feature points extracted from said existing mark in said invariant feature space, and determines that said existing mark can be used as a marker that is detectable from said image when the number of the feature points matching with said unique features is equal to or more than a predetermined number.

4. A marker determination device according to claim 1, comprising a notifying unit configured to notify a result of a determination by said feature comparator to the outside.

5. A marker determination detection system comprising a marker determination device and a marker detection device:
  wherein said marker determination device comprises:
    a first video image inputting unit configured to inputs an image;
    a first arranging unit configured to extract feature points from said image inputted by this first video image inputting unit and displays these extracted feature points onto a predetermined space;
    a unique feature selector configured to select as unique features portions of said space in which the number of said feature points is equal to or less than a predetermined number;
    a feature comparator configured to arrange the feature points based upon an existing mark in said predetermined space, select the feature points matching with said unique features, and determine that said mark can be used as a marker that is detectable from said image when the number of these selected feature points is equal to or more than a predetermined number;
    a marker storage configured to store the feature points of said mark; and
  wherein said marker detection device comprises:
    a second video image inputter configured to input the image;
    a second arranger configured to extract the feature points based upon said image inputted by this second video image inputting unit, and display these extracted feature points onto the predetermined space; and
    a collator configured to determine whether or not an arrangement of the feature point based upon said marker exists in an arrangement of a feature point group displayed onto said predetermined space.

6. A marker determination detection system according to claim 5:
  wherein said first arranging unit configured to arrange said extracted feature points in a feature space; and
  wherein said unique feature selector configured to select as the unique features portions of said feature space in which the number of said feature points is equal to or less than a predetermined number.

7. A marker determination detection system according to claim 5:
  wherein said first arranging unit configured to map said extracted feature points onto an invariant feature space; and
  wherein said unique feature selector configured to select as the unique features portions of said invariant feature space in which the number of said feature points is equal to or less than a predetermined number.

8. A marker determination detection device, comprising:
  a first video image inputting unit configured to input an image;
  a first arranging unit configured to extract feature points from said image inputted by this first video image inputting unit, and displays these extracted feature points onto a predetermined space;
  a unique feature selector configured to select as unique features portions of said space in which the number of said feature points is equal to or less than a predetermined number;

a feature comparator configured to arrange the feature points based upon an existing mark in said predetermined space, select the feature points matching with said unique features, and determine that said existing mark can be used as a marker that is detectable from said image when the number of these selected feature points is equal to or more than a predetermined number;

a marker storage configured to store said marker;

a second video image inputter configured to input the image;

a second arranger configured to extract the feature points based upon said image inputted by this second video image inputting unit, and display these extracted feature points onto the predetermined space; and a collator configured to determine whether or not an arrangement of the feature point corresponding to said marker exists within an arrangement of a feature point group displayed onto said predetermined space.

9. A marker determination detection device according to claim 8: wherein said first arranging unit arranges said extracted feature points in a feature space; and wherein said unique feature selector selects as the unique features portions of said feature space in which the number of said feature points is equal to or less than a predetermined number.

10. A marker determination detection device according to claim 8: wherein said first arranging unit maps said extracted feature points onto an invariant feature space; and wherein said unique feature selector selects as the unique features portions of said invariant feature space in which the number of said feature points is equal to or less than a predetermined number.

11. A marker determination method comprising the steps of:

inputting an image;

extracting feature points from said image, and displaying these extracted feature points onto a predetermined space;

selecting as unique features portions of said space in which the number of said feature points is equal to or less than a predetermined number; and arranging the feature points based upon an existing mark in said predetermined space, selecting the feature points matching with said unique features, and determining that said existing mark can be used as a marker that is detectable from said image when the number of these selected feature points is equal to or more than a predetermined number.

12. A marker determination method according to claim 11, comprising a step of arranging the feature points extracted from said existing mark in a feature space, and determining that said existing mark can be used as a marker that is detectable from said image when the number of the feature points matching with said unique features is equal to or more than a predetermined number.

13. A marker determination method according to claim 11, comprising a step of arranging the feature points extracted from said existing mark in an invariant feature space, and determining that said existing mark can be used as a marker that is detectable from said image when the number of the feature points matching with said unique features is equal to or more than a predetermined number.

14. A non-transitory computer readable storage medium storing a marker determination program for causing an information processing device to execute the processes of:

inputting an image;

extracting feature points from said image, and displaying these extracted feature points onto a predetermined space;

selecting as unique features portions of said space in which the number of said feature points is equal to or less than a predetermined number; and arranging the feature points based upon an existing mark in said predetermined space, selecting the feature points matching with said unique features, and determining that said existing mark can be used as a marker that is detectable from said image when the number of these selected feature points is equal to or more than a predetermined number.

15. A non-transitory computer readable storage medium storing a marker determination program according to claim 14, causing the information processing device to execute a process of arranging the feature points extracted from said existing mark in a feature space, and determining that said existing mark can be used as a marker that is detectable from said image when the number of the feature points matching said unique features is equal to or more than a predetermined number.

16. A non-transitory computer readable storage medium storing a marker determination program according to claim 14, causing the information processing device to execute a process of arranging the feature points extracted from said existing mark in an invariant feature space, and determining that said existing mark can be used as a marker that is detectable from said image when the number of the feature points matching said unique features is equal to or more than a predetermined number.

* * * * *